US012808727B2

(12) United States Patent
O'Donnell et al.

(10) Patent No.: US 12,808,727 B2
(45) Date of Patent: Nov. 24, 2026

(54) APPARATUSES AND METHODS FOR TEMPERATURE DETECTION USING ELECTRICAL SENSORS WITH PHASE CHANGE MATERIALS

(71) Applicant: Analog Devices International Unlimited Company, Limerick (IE)

(72) Inventors: Alan O'Donnell, Castletroy (IE); Michael P. Lynch, Bruff (DE); Jochen Schmitt, Biedenkopf (DE); Jan Kubik, Limerick (IE); Padraig L. Fitzgerald, Mallow (IE); Javier Calpe, Valencia (ES); Stanislav Jolondcovschi, Carlow (IE); Shaun Stephen Bradley, Patrickswell (IE); Michael J. Clifford, Glenageary (IE); Gavin P. Cosgrave, Enniscorthy (IE); Alfonso Berduque, Crusheen (IE)

(73) Assignee: Analog Devices International Unlimited Company, Limerick (IE)

( * ) Notice: Subject to any disclaimer, the term of this patent is extended or adjusted under 35 U.S.C. 154(b) by 419 days.

(21) Appl. No.: 18/343,526

(22) Filed: Jun. 28, 2023

(65) Prior Publication Data

US 2024/0003756 A1 Jan. 4, 2024

Related U.S. Application Data

(60) Provisional application No. 63/357,975, filed on Jul. 1, 2022.

(51) Int. Cl.
*G01K 11/06* (2006.01)
*G01K 7/36* (2006.01)

(52) U.S. Cl.
CPC ................ *G01K 11/06* (2013.01); *G01K 7/36* (2013.01)

(58) Field of Classification Search
CPC ............. G01K 11/06; G01K 7/36; G01K 3/04
See application file for complete search history.

(56) References Cited

U.S. PATENT DOCUMENTS 3,597,976 A 8/1971 Fryar
3,675,501 A 7/1972 De Kanter
(Continued)

FOREIGN PATENT DOCUMENTS

AT 511171 A1 9/2012
CN 103069566 A * 4/2013 ......... H01L 23/4275
(Continued)

OTHER PUBLICATIONS

Zou, et al., "Temperature Estimation of Lithium-Ion Battery Based on an Improved Magnetic Nanoparticle Thermometer", IEEE Access; Received Jun. 8, 2020, accepted Jul. 1, 2020, date of publication Jul. 8, 2020, date of current version Aug. 4, 2020. Digital Object Identifier 10.1109/ACCESS.2020.3007932.
(Continued)

*Primary Examiner* — Nathaniel T Woodward
*Assistant Examiner* — Julia Fitzpatrick
(74) *Attorney, Agent, or Firm* — ArentFox Schiff LLP

(57) ABSTRACT

Aspects of the present disclosure include using particles in phase change materials to track temperature change of an object. The particles may be initially disposed at specific locations within the phase change materials. As the phase change materials transition from the solid state to the fluid state, the particles may move from the initial locations to different locations. The change in locations of the particles may be detected magnetically, electrically, optically, and/or visually. Such change may indicate that the object experienced a temperate above at least one phase transition temperature of the phase change materials.

17 Claims, 20 Drawing Sheets

(56) References Cited

U.S. PATENT DOCUMENTS

| | | | | |
|---|---|---|---|---|
| 3,859,856 | A | 1/1975 | Keele et al. | |
| 4,267,509 | A | 5/1981 | Graham | |
| 5,490,476 | A | 2/1996 | Veitch et al. | |
| 6,030,118 | A * | 2/2000 | Schneider | G01K 11/06 374/E11.006 |
| 7,048,890 | B2 | 5/2006 | Coehoorn et al. | |
| 7,547,415 | B2 | 6/2009 | Hataoka et al. | |
| 7,609,054 | B2 | 10/2009 | Tondra | |
| 9,039,280 | B2 * | 5/2015 | Peroulis | G01K 1/024 374/183 |
| 9,841,421 | B2 | 12/2017 | Dittmer | |
| 10,357,771 | B2 | 7/2019 | Bharadwaj et al. | |
| 10,809,195 | B2 | 10/2020 | Krishnamoorthy et al. | |
| 11,231,635 | B2 | 1/2022 | Moon et al. | |
| 11,355,703 | B2 | 6/2022 | Li et al. | |
| 11,525,820 | B2 | 12/2022 | Meier et al. | |
| 11,735,349 | B2 | 8/2023 | Sturcken et al. | |
| 2002/0044590 | A1 | 4/2002 | Simunovic et al. | |
| 2005/0001728 | A1 | 1/2005 | Appelt et al. | |
| 2005/0167656 | A1 | 8/2005 | Sun et al. | |
| 2006/0061454 | A1 | 3/2006 | Debord et al. | |
| 2006/0125623 | A1 | 6/2006 | Appelt et al. | |
| 2009/0026080 | A1 | 1/2009 | Han et al. | |
| 2009/0312976 | A1 * | 12/2009 | Bingham | G01J 5/53 374/2 |
| 2011/0304326 | A1 | 12/2011 | Sandhu | |
| 2012/0079981 | A1 | 4/2012 | Huffman et al. | |
| 2013/0010558 | A1 | 1/2013 | Chang et al. | |
| 2013/0085687 | A1 | 4/2013 | Danov et al. | |
| 2014/0334520 | A1 | 11/2014 | Chen et al. | |
| 2015/0133827 | A1 | 5/2015 | Seo et al. | |
| 2016/0252415 | A1 * | 9/2016 | Lu | G01L 3/102 73/862.333 |
| 2016/0324171 | A1 | 11/2016 | Rothfuss et al. | |
| 2018/0038737 | A1 | 2/2018 | Hedlund et al. | |
| 2019/0368944 | A1 | 12/2019 | Jensen | |
| 2021/0325484 | A1 | 10/2021 | Pellegrino et al. | |
| 2022/0371019 | A1 | 11/2022 | Mei et al. | |
| 2022/0412933 | A1 | 12/2022 | Millman et al. | |
| 2023/0026419 | A1 | 1/2023 | Grasso et al. | |
| 2023/0085052 | A1 | 3/2023 | Klein et al. | |
| 2023/0152166 | A1 | 5/2023 | O'Donnell et al. | |
| 2023/0349987 | A1 | 11/2023 | Odonnell et al. | |
| 2023/0400292 | A1 | 12/2023 | Li et al. | |
| 2024/0272019 | A1 | 8/2024 | Engeberg | |

FOREIGN PATENT DOCUMENTS

| | | | | |
|---|---|---|---|---|
| CN | 108027286 | B * | 3/2021 | G01K 15/005 |
| DE | 102009040486 | B3 | 4/2011 | |
| DE | 102016006453 | A1 * | 11/2017 | C30B 11/006 |
| EP | 2988107 | A1 | 2/2016 | |
| EP | 3896470 | A1 | 10/2021 | |
| JP | 2012122863 | A * | 6/2012 | |
| KR | 20140077344 | A * | 6/2014 | G01C 17/32 |
| WO | 03052367 | A1 | 6/2003 | |
| WO | 2008073939 | A2 | 6/2008 | |
| WO | WO-2012046638 | A1 * | 4/2012 | G01K 11/06 |
| WO | 2020231921 | A1 | 11/2020 | |

OTHER PUBLICATIONS

International Search Report in PCT/EP2023/06789, mailed Sep. 20, 2023, 13 pages.

International Search Report in PCT/EP2023/067899, mailed Sep. 22, 2023, 13 pages.

International Search Report in PCT/EP2023/067896, mailed Sep. 11, 2023, 13 pages.

Liu, et al., "A Frequency- and Polarization-Reconfigurable Slot Antenna Using Liquid Metal", IEEE Transactions on Antennas and Propagation, vol. 68, No. 11, Nov. 2020.

Zhang, et al., "Low-Profile Liquid Metal Based Polarization Reconfigurable Antenna on an AMC Surface", Proceedings of 2022 Asia-Pacific Microwave Conference.

International Search Report in PCT/EP2023/067894, mailed Sep. 14, 2023, 13 pages.

Invitation to Pay Fees in PCT/EP2023/067894, mailed Sep. 20, 2023, 13 pages.

International Search Report and Written Opinion in PCT/EP2023/067898, mailed Nov. 14, 2023, 19 pages.

Hsieh et al., "Multilayered vectorial fluxgate magnetometer based on PCB technology and dispensing process", Measurement Science and Technology, IOP publishing, vol. 30, 2019, pp. 1-6.

* cited by examiner

APPARATUSES AND METHODS FOR TEMPERATURE DETECTION USING ELECTRICAL SENSORS WITH PHASE CHANGE MATERIALS

CROSS-REFERENCE TO RELATED APPLICATIONS

The current application claims priority to, and the benefit of, U.S. Provisional Application No. 63/357,975 filed Jul. 1, 2022, entitled "PARTICLES IN PLURALITY OF ENCLOSURES WITH PHASE CHANGE MATERIAL FOR DETECTION OF THERMAL EXPOSURE," the contents of which are hereby incorporated by reference in their entireties.

BACKGROUND

Many engineering, pharmaceutical, medical, and/or consumer products require strict monitoring of temperature exposure. When storing and/or transporting these products, it is important to know whether the products have exceeded a certain threshold temperature. For example, some vaccines must be stored/transported at a sufficiently low temperature to ensure their efficacy. Food products may be prone to bacteria growth when exposed to certain temperatures. While a heat, ventilation, and air conditioning (HVAC) unit may be used to control the temperature of the enclosure containing the products, it is possible for the temperature to "spike" above the threshold temperature (e.g., temporarily for 1 minute). As such, the products may degrade without warning signs. Therefore, improvements in the mechanism for monitoring temperature change and exposure may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include monitoring temperature exposure and other parameters that can be inferred through monitoring different temperature sensitive materials incorporated within systems containing a plurality of containers.

Aspects of the present disclosure include an array including a plurality of enclosures, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, a plurality of particles disposed in the plurality of enclosures, and a sensor substrate having a plurality of sensors electrically coupled with the sensor substrate, where each of the plurality of sensors is configured to measure a corresponding set of particles in a corresponding enclosure and detect a first response associated with the corresponding set of particles in a first location within the corresponding enclosure, and a second response associated with the corresponding set of particles in a second location within the corresponding enclosure, wherein the first location and the second location are different.

An array including a support substrate having thermal conduction pathways configured to provide thermal conduction between the array and an object, a plurality of enclosures, a plurality of phase change materials each disposed in a corresponding enclosure of the plurality of enclosures, wherein each of the plurality of enclosures includes a phase change material having a phase transition temperature that is different than remaining phase transition temperatures of remaining phase change materials of the plurality of phase change materials, a plurality of magnetic particles disposed in the plurality of enclosures, and a sensor substrate having a plurality of sensors electrically coupled with the sensor substrate, where each of the plurality of sensors is configured to measure a corresponding set of magnetic particles in a corresponding enclosure and detect a first magnetic response associated with the corresponding set of magnetic particles in a first location within the corresponding enclosure, and a second magnetic response associated with the corresponding set of magnetic particles in a second location within the corresponding enclosure, wherein the first location and the second location are different.

A temperature tracking system including a plurality of arrays removably attached to a plurality of objects, each array of the plurality of arrays includes: a support substrate having thermal conduction pathways configured to provide thermal conduction between the array and a corresponding object of the plurality of objects, a plurality of enclosures, a plurality of phase change materials each disposed in a corresponding enclosure of the plurality of enclosures, wherein each of the plurality of enclosures includes a phase change material having a phase transition temperature that is different than remaining phase transition temperatures of remaining phase change materials of the plurality of phase change materials, a plurality of magnetic particles disposed in the plurality of enclosures, and a sensor substrate having a plurality of sensors electrically coupled with the sensor substrate, where each of the plurality of sensors is configured to measure a corresponding set of magnetic particles in a corresponding enclosure and detect a first magnetic response associated with the corresponding set of magnetic particles in a first location within the corresponding enclosure, and a second magnetic response associated with the corresponding set of magnetic particles in a second location within the corresponding enclosure, wherein the first location and the second location are different, a magnet configured to attract or repel the plurality of magnetic particles, and a controller configured to determine a temperature or a temperature range reached by each of the plurality of objects based on measurements by each corresponding plurality of sensors.

Aspects of the present disclosure include a method of implementing a digital ledger including disposing a first plurality of particles at first locations of a first plurality of enclosures, disposing a second plurality of particles at second locations of a second plurality of enclosures, wherein each of the first plurality of particles at a corresponding first location of a corresponding enclosure generates a first response that is different than a second response generated by each of the second plurality of particles at a corresponding second location of a corresponding enclosure, measuring a plurality of signals generated by the first plurality of particles at the first locations of the first plurality of enclosures and the second plurality of particles at the second locations of the second plurality of enclosures, and generating one or more of an encryption key or a decryption key based on the plurality of signals.

A digital ledger including a first plurality of enclosures, a second plurality of enclosures, a first plurality of particles disposed at first locations of the first plurality of enclosures, a second plurality of particles disposed at second locations of the second plurality of enclosures, wherein each of the first plurality of particles at a corresponding first location of a corresponding enclosure generate a first response that is different than a second response generated by each of the second plurality of particles at a corresponding second location of a corresponding enclosure, and a plurality of sensors configured to measure a plurality of signals generated by the first plurality of particles at the first locations of the first plurality of enclosures and the second plurality of particles at the second locations of the second plurality of enclosures, wherein the plurality of signals is used to identify the digital ledger.

A digital ledger including a support substrate, a plurality of enclosures arranged into an array on the support substrate, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, a plurality of magnetic particles disposed throughout a portion of the plurality of enclosures to spatially form a pattern across the array, a plurality of sensors configured to measure a plurality of signals generated by the plurality of magnetic particles, and a sensor substrate configured to: detect the pattern based on the plurality of signals, and generate one or more of an encryption key or a decryption key based on the pattern.

A visual indicator including a plurality of enclosures, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, and a plurality of particles disposed in the plurality of enclosures, wherein corresponding particles disposed in a first location of an enclosure of the plurality of enclosures are configured to display a first visual signal and the corresponding particles disposed in a second location of the enclosure are configured to display a second visual signal.

A visual indicator including a support substrate having thermal conduction pathways configured to provide thermal conduction between the visual indicator and an object, a plurality of enclosures, a plurality of phase change materials each disposed in a corresponding enclosure of the plurality of enclosures, wherein each of the plurality of enclosures includes a phase change material that is different than remaining phase change materials of the plurality of phase change materials, and a plurality of particles disposed in the plurality of enclosures, wherein corresponding particles disposed in a first location of an enclosure of the plurality of enclosures are configured to display a first visual signal and the corresponding particles disposed in a second location of the enclosure are configured to display a second visual signal.

A optical indicator including a plurality of optical indicators, each including: a support substrate having thermal conduction pathways configured to provide thermal conduction between the optical indicator and an object, a plurality of enclosures, a plurality of phase change materials each disposed in a corresponding enclosure of the plurality of enclosures, wherein each of the plurality of enclosures includes a phase change material that is different than remaining phase change materials of the plurality of phase change materials, and a plurality of particles disposed in the plurality of enclosures, wherein corresponding particles disposed in a first location of an enclosure of the plurality of enclosures are configured to display a first visual signal and the corresponding particles disposed in a second location of the enclosure are configured to display a second visual signal, and an optical detector configured to detect the first visual signal and the second visual signal.

A temperature detector including a container having a first end, a second end, and an area, wherein a first pressure of the first end is higher than a second pressure of the second end, a pair of electrodes configured to apply a voltage across the area, at least one phase change material disposed in the first end and providing a barrier between the first end and the area, and a plurality of particles disposed in the at least one phase change material, wherein, in response to a temperature of the container rises above a phase transition temperature of the at least one phase change material the at least one phase change material transitions from a solid state to a fluid state, at least a portion of the plurality of particles is configured to diffuse into the area, and the application of the voltage is configured to cause a spark conduction in the area.

A temperature detection system including a plurality of temperature detectors each including a container having a first end, a second end, and an area, wherein a first pressure of the first end is higher than a second pressure of the second end, a pair of electrodes configured to apply a voltage across the area, at least one phase change material disposed in the first end and providing a barrier between the first end and the area, and a plurality of particles disposed in the at least one phase change material, wherein, in response to a temperature of the container rises above a phase transition temperature of the at least one phase change material the at least one phase change material transitions from a solid state to a fluid state, at least a portion of the plurality of particles is configured to diffuse into the area, and the application of the voltage is configured to cause a spark conduction in the area, and a controller configured to apply the voltage, determine, based on the applied voltage, a temperature or a temperature range reached by the temperature detection system.

A sensor including a plurality of enclosures, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, and a plurality of particles disposed in the plurality of enclosures, a coil configured to generate an electromagnetic field configured to excite the plurality of particles, wherein exciting corresponding particles of an enclosure when the corresponding particles are disposed in a first location causes a first excitation response, and exciting the corresponding particles of the enclosure when the corresponding particles are disposed in a second location causes a second excitation response.

A temperature detection system including a plurality of sensors, each including a plurality of enclosures, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, and a plurality of particles disposed in the plurality of enclosures, a coil configured to generate an electromagnetic (EM) field configured to excite the plurality of particles, wherein exciting corresponding particles of an enclosure when the corresponding particles are disposed in a first location causes a first excitation response, and exciting the corresponding particles of the enclosure when the corresponding particles are disposed in a second location causes a second excitation response, and a controller configured to apply an excitation voltage or an excitation current for generating the EM field, determine, based on a characteristics of the excitation voltage or the excitation current, a temperature or a temperature range reached by the temperature detection system.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some aspects of the present disclosure, a detector apparatus may include particles suspended in a phase change material inside a container. The particles may be disposed at a location within the container when the phase change material is transitioned from a fluid state (gaseous or liquid) to a solid state. As such, the particles may be "locked in" at the location at a certain/defined temperature depending on the material in question. If the container is exposed to a temperature that is higher than a threshold temperature (e.g., a phase transition temperature such as the melting point) of the phase change material, the particles may move from one location to one or more other locations within the container due to the phase change material transitioning from the solid state to the fluid state. The change in location of the particles may be detected magnetically, electrically, capacitively, or optically, and signals that the container has been exposed to the temperature that is higher than the threshold temperature.

Figure 1:
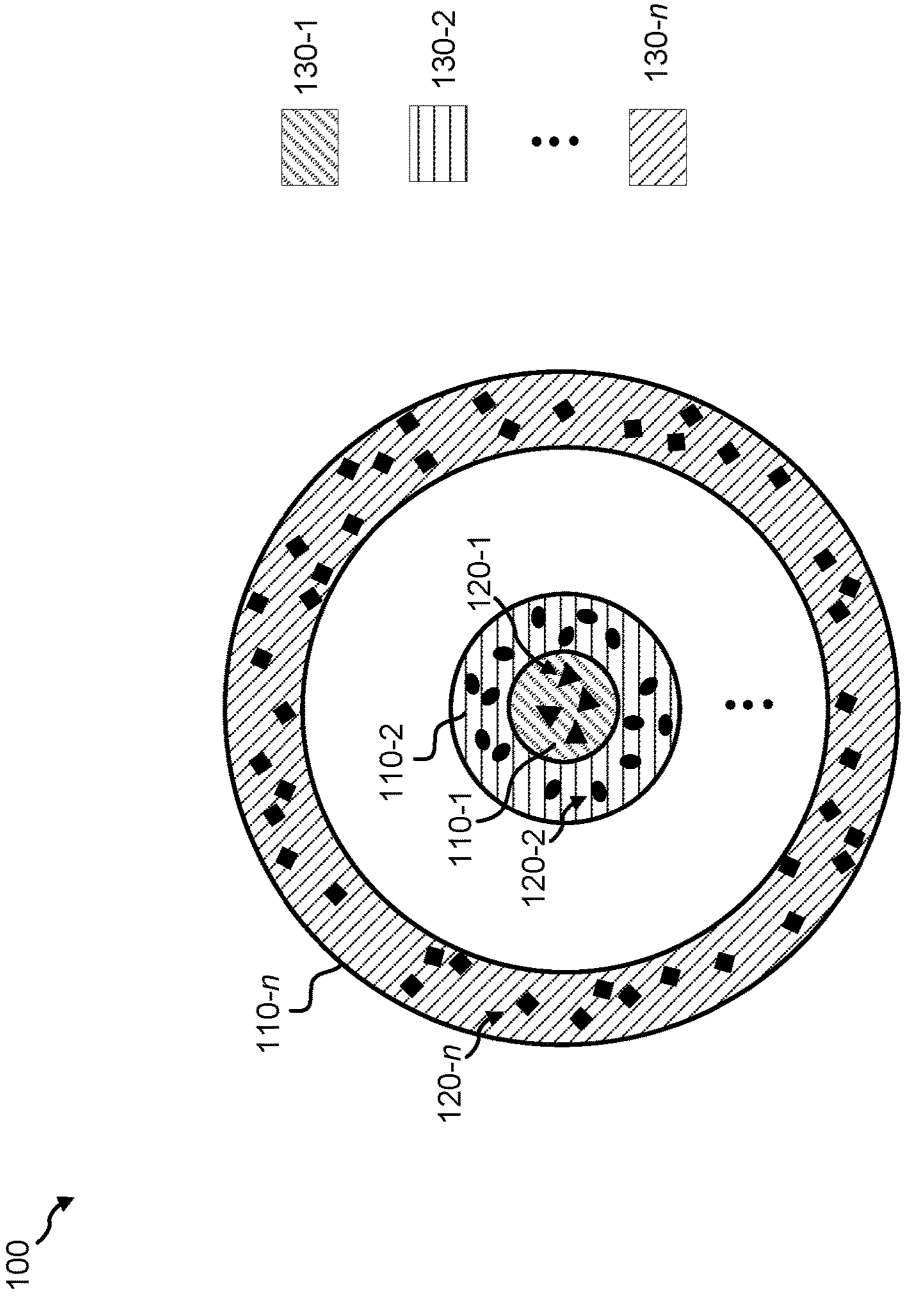
FIG. 1 illustrates an example of a first container having concentric enclosures according to aspects of the present disclosure.

FIG. 1 illustrates an example of a first container 100 having concentric enclosures according to aspects of the present disclosure. The first container 100 may include a plurality of enclosures 110-1, 110-2 . . . **110-*n*, wherein n is a positive integer. The plurality of enclosures 110-1, 110-2 . . . 110-*n* may include a plurality of magnetic particles 120-1, 120-2 . . . 120-*n*. The plurality of enclosures 110-1, 110-2 . . . 110-*n* may include a plurality of phase change materials 130-1, 130-2 . . . 130-*n*. The plurality of magnetic particles 120-1, 120-2 . . . 120-*n* may be the same or different type. At least one of the plurality of phase change materials 130-1, 130-2 . . . 130-*n* may have a different phase transition temperature as another phase change material of the plurality of phase change materials 130-1, 130-2 . . . 130-*n*. In one implementation, each of the plurality of phase change materials 130-1, 130-2 . . . 130-*n* may have a different phase transition temperature. In one example, the first phase change material 130-1 may have a first phase transition temperature, the second phase change material 130-2 may have a second phase transition temperature higher than the first phase transition temperature . . . and the $n^{th}$ phase change material 130-*n* may have an $n^{th}$ phase transition temperature higher than the phase transition temperatures of the remain phase change materials 130-1, 130-2 . . . 130-**(*n*−1).

In some aspects, an enclosure may be a space that is fully enclosed from all sides. In other aspects, an enclosure may be a recess, a hole, or other space that is partially enclosed. Other forms of an enclosure may also be implemented according to aspects of the present disclosure.

In some aspects of the present disclosure, the plurality of magnetic particles 120-1, 120-2 . . . **120-*n*** may include ferromagnetic particles (soft and hard magnetic particles), paramagnetic particles, superparamagnetic particles, and/or diamagnetic particles.

In some aspect, each of the plurality of enclosures 110-1, 110-2 . . . **110-*n* may include corresponding magnetic particles and a corresponding phase change material. For example, the first enclosure 110-1 may have the first magnetic particles 120-1 and first phase change material 130-1, the second enclosure 110-2 may have the second magnetic particles 120-2 and second phase change material 130-2 . . . and the $n^{th}$ enclosure 110-*n* may have the $n^{th}$ magnetic particles 120-*n* and the $n^{th}$ phase change material 130-*n***.

During operation, in certain aspects of the present disclosure, each of the plurality of magnetic particles 120-1, 120-2 . . . **120-*n* may be disposed at a predetermined location within a corresponding enclosure when the plurality of phase change materials 130-1, 130-2 . . . 130-*n* are in the fluid state. Next, the temperature of the first container 100 may be lowered such that the plurality of phase change materials 130-1, 130-2 . . . 130-*n* are in the solid state. For example, if the first container 100 is cylindrical (image shown is the bottom or top surface of the first container) the first magnetic particles 120-1 may be disposed at the bottom of the first enclosure 110-1, the second magnetic particles 120-2 may be disposed at the bottom of the second enclosure 110-2 . . . and the $n^{th}$ magnetic particles 120-*n* may be disposed at the bottom of the $n^{th}$ enclosure 110-*n*. Other locations for disposing the plurality of magnetic particles 120-1, 120-2 . . . 120-*n*** within the corresponding enclosures may also be implemented according to aspects of the present disclosure. In some embodiments the particles themselves may not be magnetic but the fluid in which they are embedded may have magnetic properties. Also, the size, shape, and construction of the particles and container can be modified and optimized depending on the specific requirements of the application.

In some aspects, after freezing the plurality of phase change materials 130-1, 130-2 . . . **130-*n*, the first container 100 may be ready for temperature detection. If the temperature of the first container 100 increases above the first phase transition temperature of the first phase change material 130-1, the first magnetic particles 120-1 may move away from the corresponding predetermined location within the first enclosure 110-1. For example, the movement may be caused by gravity (e.g., the first magnetic particles 120-1 may "sink" from the top of the first enclosure 110-1 to the bottom of the first enclosure 110-1), buoyancy (e.g., the first magnetic particles 120-1 may "float" from the bottom of the first enclosure 110-1 to the top of the first enclosure 110-1), dispersion (e.g., the first magnetic particles 120-1 may randomly disperse throughout the first phase change material 130-1 in fluid state), electromagnetic force (e.g., the first magnetic particles 120-1 may move to a particular location within the first enclosure 110-1** based on the application of the electromagnetic force), or other mechanisms.

In one aspect, if the temperature of the first container 100 increases above the second phase transition temperature of the second phase change material 130-2, the second magnetic particles 120-2 may move away from the corresponding predetermined location within the second enclosures 110-2, and so forth and so on.

In some aspects, a detector (not shown) may detect which of the plurality of magnetic particles 120-1, 120-2 . . . **120-*n* moved from their corresponding predetermined locations. Based on the detection described above, the detector is able detect a temperature or a temperature range that the first container 100 has reached based on the locations of the plurality of magnetic particles 120-1, 120-2 . . . 120-*n***. Example mechanism of detection is discussed below in detail.

In one example, the first container 100 may have three enclosures 110-1, 110-2, 110-3. The first phase change material 130-1 may have a phase transition temperature of −10 degree Celsius (° C.), the second phase change material 130-2 may have a phase transition temperature of −5° C., and the phase change material 130-3 may have a third phase transition temperature of 0° C. After positioning the magnetic particles 120-1, 120-2, 120-3 in their corresponding locations, a detector may be able to detect a temperature or temperature range that the first container 100 is exposed to. For example, if the first magnetic particles 120-1 have moved and the second magnetic particles 120-2 have not moved, the highest temperature that the first container 100 has been exposed to is lower than −5° C. Methods of detecting the particle position could include optical, magnetic sensing structures incorporated in the container, conductive structures incorporated in the container (detecting particles contacting specific areas or surfaces) etc.

Figure 2:
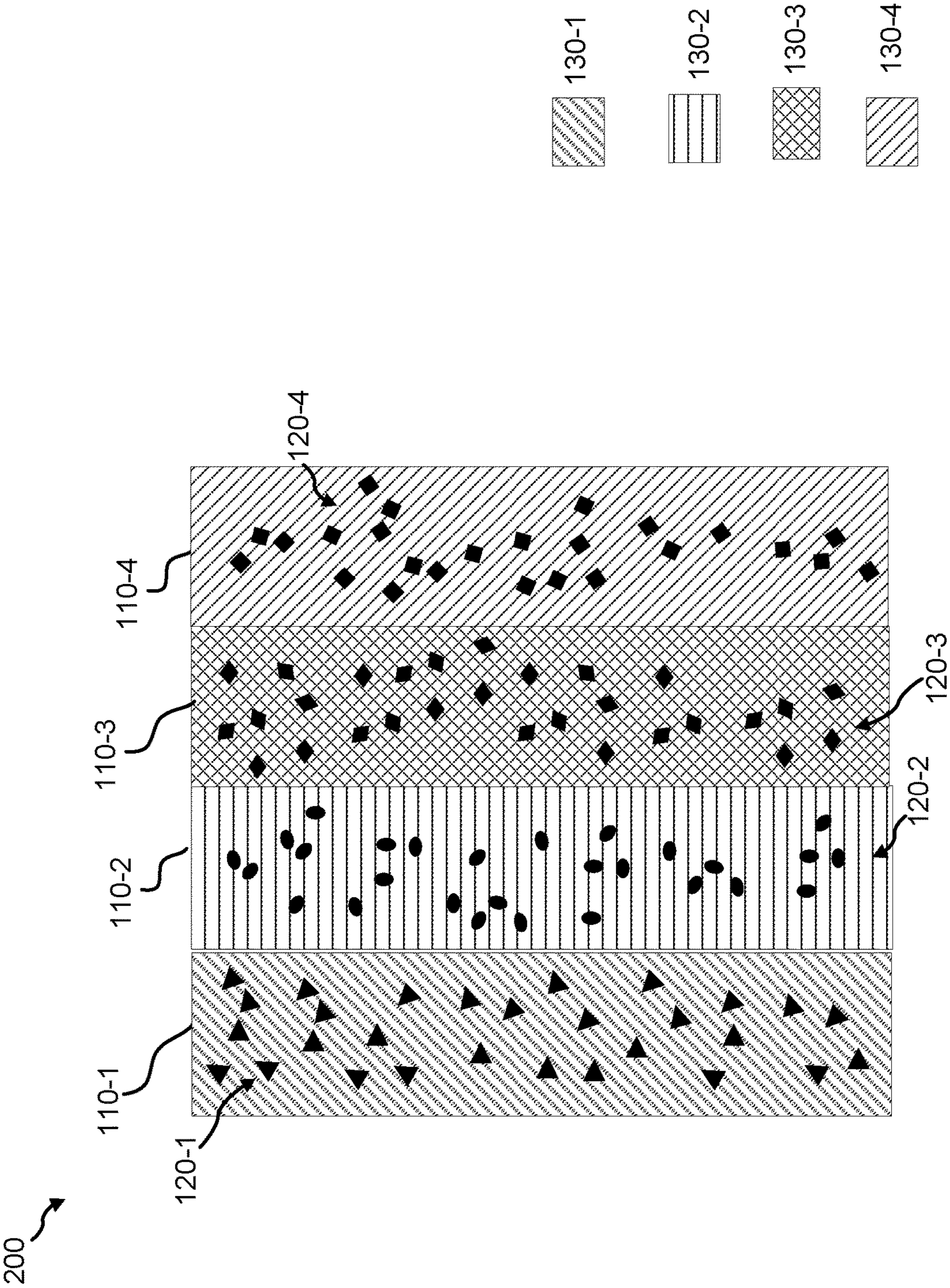
FIG. 2 illustrates an example of a second container having columnar enclosures according to aspects of the present disclosure.

FIG. 2 illustrates an example of a second container 200 having columnar enclosures according to aspects of the present disclosure. In an aspect of the current disclosure, the second container 200 may operate according to the same principle as the first container 100 (FIG. 1).

In one example, the second container 200 may have four enclosures 110-1, 110-2, 110-3, 110-4. The first phase change material 130-1 may have a phase transition temperature of −20 degree ° C., the second phase change material 130-2 may have a phase transition temperature of −18° C., the third phase change material 130-3 may have a third phase transition temperature of −16° C., and the fourth phase change material 130-4 may have a phase transition temperature of −14° C. After positioning the magnetic particles 120-1, 120-2, 120-3, 120-4 in their corresponding locations, a detector may be able to detect a temperature or temperature range that the second container 200 is exposed to. For example, if the first magnetic particles 120-1 and the second magnetic particles 120-2 have moved, and the third magnetic particles 120-3 and the fourth magnetic particles 120-4 have not moved, the highest temperature that the second container 200 has been exposed to is between −18° C. and −16° C.

Figure 3:
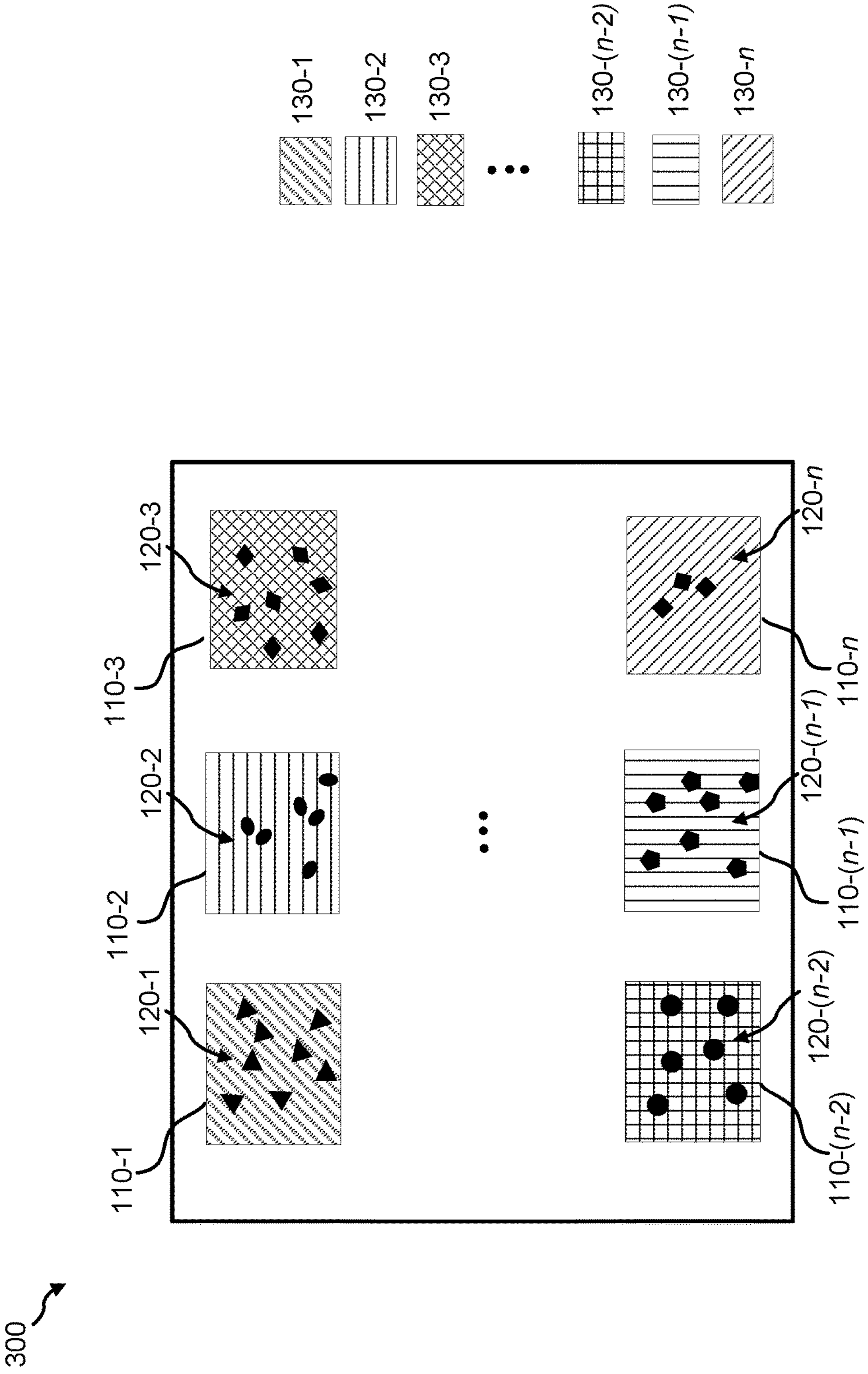
FIG. 3 illustrates an example of a third container having a number of enclosures arranged in grid configurations according to aspects of the present disclosure.

FIG. 3 illustrates an example of a third container 300 having a number of enclosures arranged in grid configurations according to aspects of the present disclosure. In an aspect of the current disclosure, the third container 300 may operate according to the same principle as the first container 100 (FIG. 1) and/or the second container 200 (FIG. 2).

Container and particle shape, size construction etc. can be modified and optimized to suit the specific requirements of the application.

In one example, the third container 300 may have nine enclosures 110-1, 110-2, 110-3, 110-4, 110-5, 110-6, 110-7, 110-8, 110-9. The first phase change material 130-1 may have a phase transition temperature of −90 degree ° C., the second phase change material 130-2 may have a phase transition temperature of −80° C., the third phase change material 130-3 may have a third phase transition temperature of −70° C., the fourth phase change material 130-4 may have a phase transition temperature of −60° C., the fifth phase change material 130-5 may have a phase transition temperature of −50° C., the sixth phase change material 130-6 may have a phase transition temperature of −40° C., the seventh phase change material 130-7 may have a phase transition temperature of −30° C., the eighth phase change material 130-8 may have a phase transition temperature of −20° C., and the ninth phase change material 130-9 may have a phase transition temperature of −10° C. After positioning the magnetic particles 120-1, 120-2 . . . 120-9 in their corresponding locations, a detector may be able to detect a temperature or temperature range that the third container 300 is exposed to. For example, if the first magnetic particles 120-1 and the second magnetic particles 120-2 have moved, and the third magnetic particles 120-3 and the fourth magnetic particles 120-4 have not moved, the highest temperature that the third container 300 has been exposed to is between −80° C. and −70° C.

Figure 4:
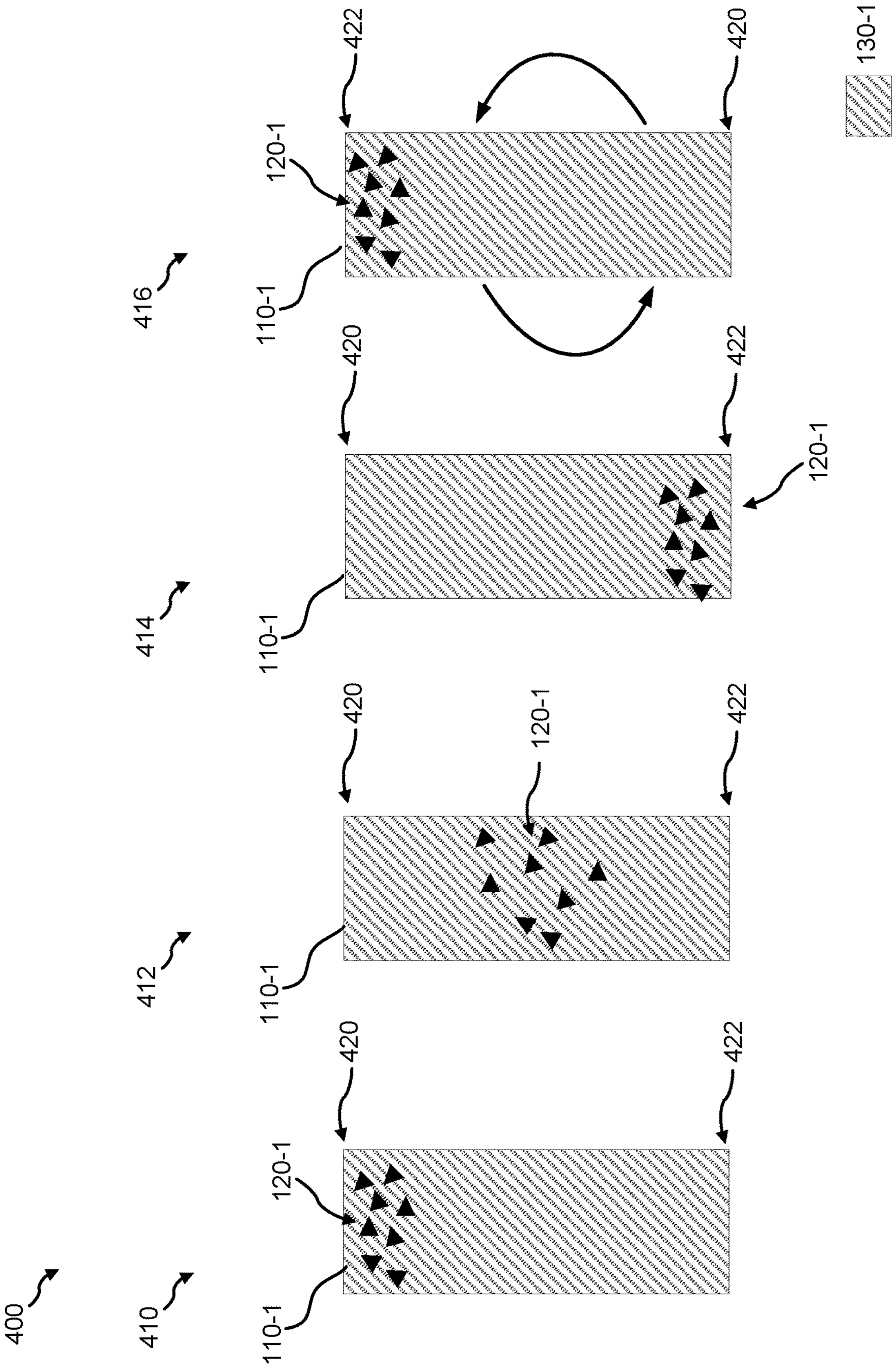
FIG. 4 illustrates an example of a scheme for operating and/or resetting a container according to aspects of the present disclosure.
Figure 5:
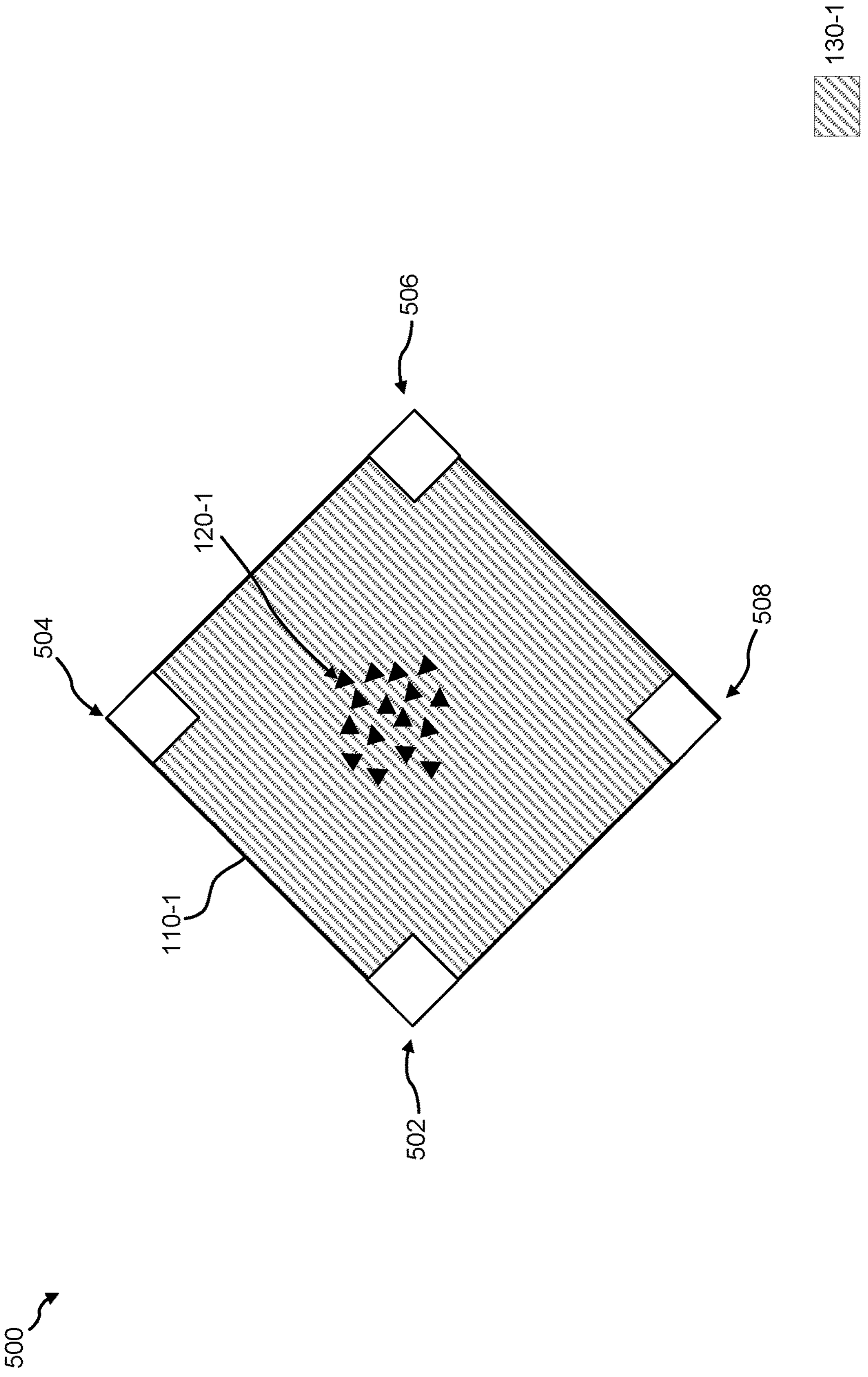
FIG. 5 illustrates an example of a fourth container according to aspects of the present disclosure.

FIG. 4 illustrates an example of a scheme 400 for operating and/or resetting a container according to aspects of the present disclosure. In some aspects of the present disclosure, at a first step 410, the first enclosure 110-1 may have the first magnetic particles 120-1 disposed at a first end 420 of the first enclosure 110-1. The first phase change material 130-1 may be in the solid state. At a second step 412, the first phase change material 130-1 may transition into the fluid state, and the first magnetic particles 120-1 may move toward a second end 422 of the first enclosure 110-1. At a third step 414, the first magnetic particles 120-1 may congregate at the second end 422. As such, the detector (not shown) may be able to detect the first magnetic particles 120-1 at the second end 422, and therefore, a change in the first phase change material 130-1 caused by an increase in temperature. At a fourth step, the temperature of the first enclosure 110-1 may be lowered below the phase transition temperature of the first phase change material 130-1 such that the first phase change material 130-1 may transition back into the solid state. Additionally, the first enclosure 110-1 may be rotated after the first phase change material 130-1 transitions back into the solid state. As such, the first magnetic particles 120-1 may now be disposed at the second end 422 of the first enclosure 110-1, and the first enclosure 110-1 may be “reset” to be ready for another detection. Container and particle shape, size construction etc. can be modified and optimized to suit the specific requirements of the application FIG. 5 illustrates an example of a fourth container 500 according to aspects of the present disclosure. In some aspects of the present disclosure, the fourth container 500 may include the first enclosure 110-1 having the first magnetic particles 120-1 in the first phase change material 130-1. The fourth container 500 may include a first section 502, a second section 504, a third section 506, and a fourth section 508. In one aspect, the fourth container 500 may be configured to perform the reset function as described above. For example, the first magnetic particles 120-1 may disposed at an initial position, namely at or around one or more of the first section 502, the second section 504, the third section 506, and the fourth section 508 when the first phase change material 130-1 is in the solid state. After the first phase change material 130-1 changes from the solid state to the fluid state, the first magnetic particles 120-1 may drift from the initial position. The fourth container 500 may be reset by disposing the first magnetic particles 120-1 back to the initial position.

Figure 6A:
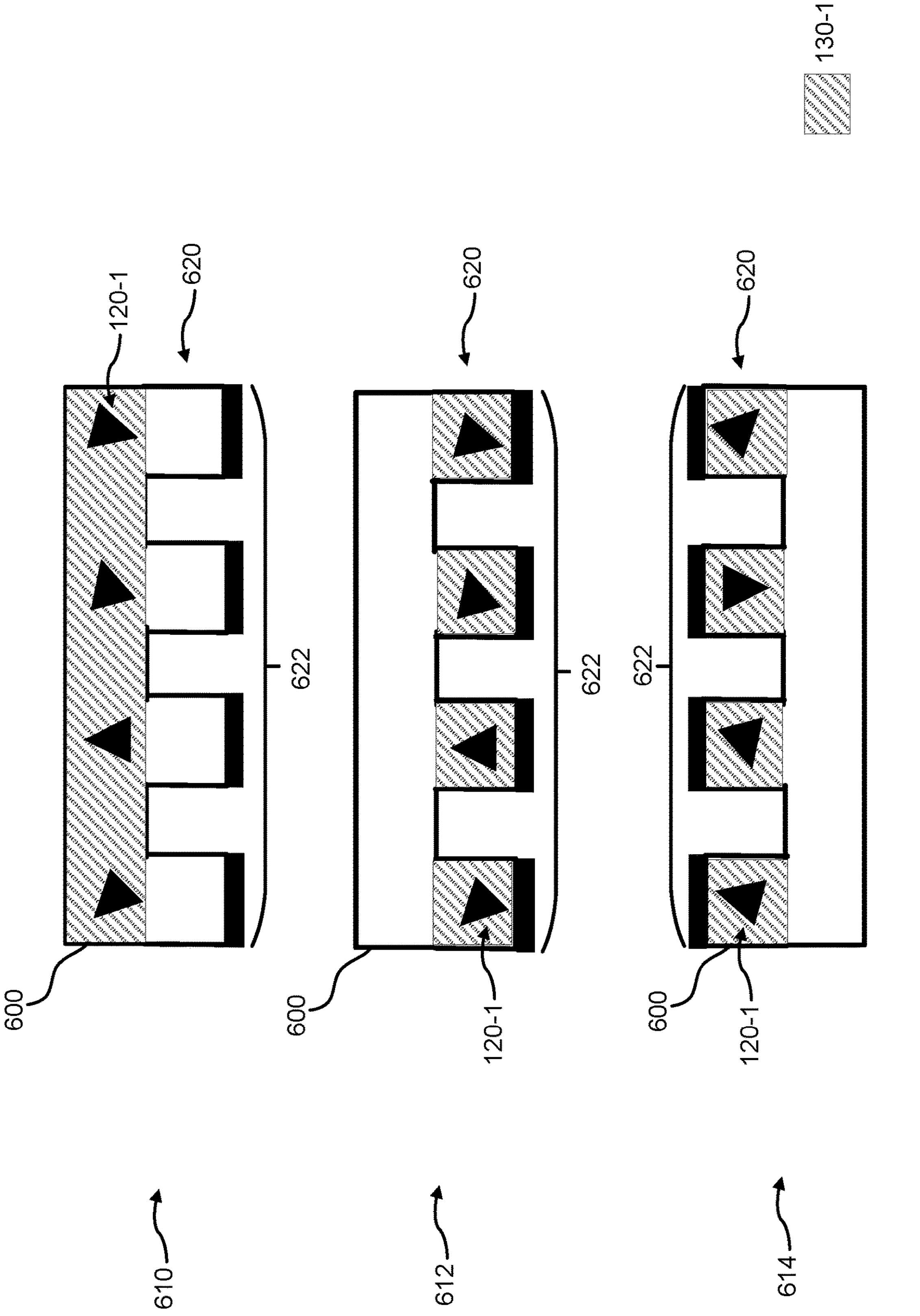
FIG. 6A illustrates an example of a fifth container according to aspects of the present disclosure.

FIG. 6A illustrates an example of a fifth container 600 according to aspects of the present disclosure. In some aspects, the fifth container 600 may include the first magnetic particles 120-1 and the first phase change material 130-1. The fifth container 600 may include one or more recesses 620. The fifth container 600 may include one or more sensors 622 each associated with a corresponding recess of the one or more recesses 620. The one or more sensors 622 may be configured to detect whether the first magnetic particles 120-1 are in or out of the one or more recesses 620. The one or more sensors 622 may be magnetic sensors configured to detect magnetic materials in the first magnetic particles 120-1, optical sensors configured to optically detect the first magnetic particles 120-1, weight sensors configured to detect the pressure applied by the first magnetic particles 120-1, and/or other types of sensors.

During operation, at 610, the first magnetic particles 120-1 may be disposed in the first phase change material 130-1 while the first phase change material 130-1 is in the solid state. The first magnetic particles 120-1 may be disposed outside the one or more recesses 620. For example, the first magnetic particles 120-1 may be suspended, in the first phase change material 130-1, over the one or more recesses 620. As such, the one or more sensors 622 may not detect the presence of the first magnetic particles 120-1.

Next, at 612, the temperature of the fifth container 600 may be raised above the first phase transition temperature of the first phase change material 130-1. As a result, the first phase change material 130-1 may transition from the solid state to the fluid state (gas or liquid). Consequently, the first magnetic particles 120-1 may enter the one or more recesses 620. For example, the fifth container 600 may be oriented such that the first phase change material 130-1 (in the fluid state) and the first magnetic particles 120-1 may fall (due to gravity) into the one or more recesses 620. In another example, a magnet (not shown) may attract the first magnetic particles 120-1 into the one or more recesses 620. Other mechanisms may be used to dispose the first magnetic particles 120-1 into the one or more recesses 620 according to aspects of the present disclosure.

Next, the one or more sensors 622 may detect the presence of the first magnetic particles 120-1 in the one or more recesses 620. Based on this detection, the one or more sensors 622 (or other controllers, not shown) may determine that the first phase change material 130-1 has transitioned from the solid state to the fluid state due to the temperature rising above the first phase transition temperature.

Next, at 614 the fifth container 600 may be reset according to aspects of the present disclosure. The fifth container 600 may be oriented such that the first magnetic particles 120-1 and/or the first phase change material 130-1 are displaced from the one or more recesses 620 when the first phase change material 130-1 is in the fluid state. The temperature of the fifth container 600 may be lowered below the first phase transition temperature such that the first phase change material 130-1 returns back to the solid state. Consequently, the first magnetic particles 120-1 may be “frozen” in the first phase change material 130-1, and the fifth container 600 is properly reset.

In some aspects, different structures, recesses, particles, and/or openings may be implemented according to aspects of the present disclosure. Container and particle shape, size construction etc. can be modified and optimized to suit the specific requirements of the application.

Figure 6B:
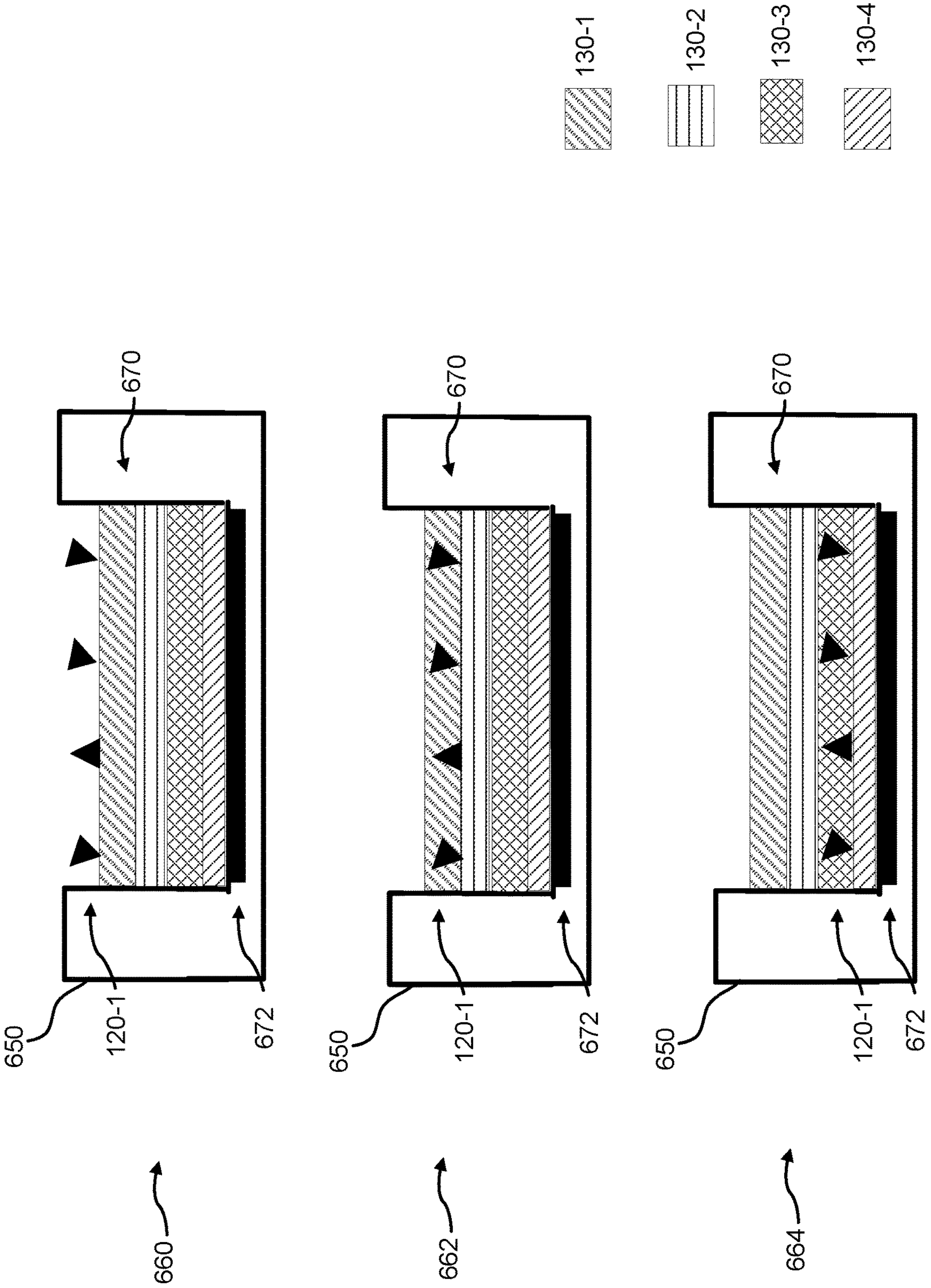
FIG. 6B illustrates an example of an alternative implementation of the fifth container according to aspects of the present disclosure.

FIG. 6B illustrates an alternative implementation of a container 650 shows where phase change materials may be stacked in a vertical orientation such that particles may move through layers (depending on the temperature exposure) enabling the construction to produce a discernible signature that can be converted into a temperature profile or exposure range. Although FIG. 6B shows the sensing element on the bottom of the recess, the actual location can be changed depending on the specific application. Also the substrates described in this filing could be silicon or glass or laminate or surgical steel or composite or another suitable material depending on the requirements of the application.

In one aspect of the present disclosure, the container 650 may include a recess 670 configured to include the plurality of phase change materials 130-1, 130-2, 130-3, 130-4. The container 650 may include first magnetic particles 120-1. The container 650 may include one or more sensors 672 configured to detect magnetic, electrical, and/or optical properties of the first magnetic particles 120-1. The plurality of phase change materials 130-1, 130-2, 130-3, 130-4 may have different phase transition temperatures as described above.

During operation, at 660, the plurality of phase change materials 130-1, 130-2, 130-3, 130-4 may be in the solid state and the first magnetic particles 120-1 may be disposed on top of the plurality of phase change materials 130-1, 130-2, 130-3, 130-4. At 662, as the temperature of the container 650 rises above the first phase transition temperature of the first phase change material 130-1, the first phase change material 130-1 may transition from the solid state to the fluid state (while the remaining phase change materials 130-2, 130-3, 130-4 remain in the solid state) and the first magnetic particles 120-1 may sink into the first phase change material 130-1. The one or more sensors 672 may detect this change based on changes in the magnetic, electrical, and/or optical response.

At 664, as the temperature of the contain 650 rises above the third phase transition temperature of the third phase change material 130-3, the first phase change material 130-1, the second phase change material 130-2, and the third phase change material 130-3 may transition into the fluid state. As a result, the first magnetic particles 120-1 may sink and settle on top of the fourth phase change material 130-4.

In another aspect of the present disclosure, the first magnetic particles 120-1 may be distributed unevenly throughout the first phase change material 130-1 (e.g., the concentration of the first magnetic particles 120-1 in one region is different than the concentration in another region). The container temperature may be lowered such that the first phase change material 130-1 transitions into the solid state. The first magnetic particles 120-1 may remain unevenly distributed. As the container temperature rises above the first phase transition temperature, the first magnetic particles 120-1 may freely move throughout the first phase change material 130-1. Consequently, the first magnetic particles 120-1 may change from an uneven distribution to an even distribution (e.g., due to Brownian motion). As such, the change may be electrically, magnetically, optically, or visually detected.

Figure 7:
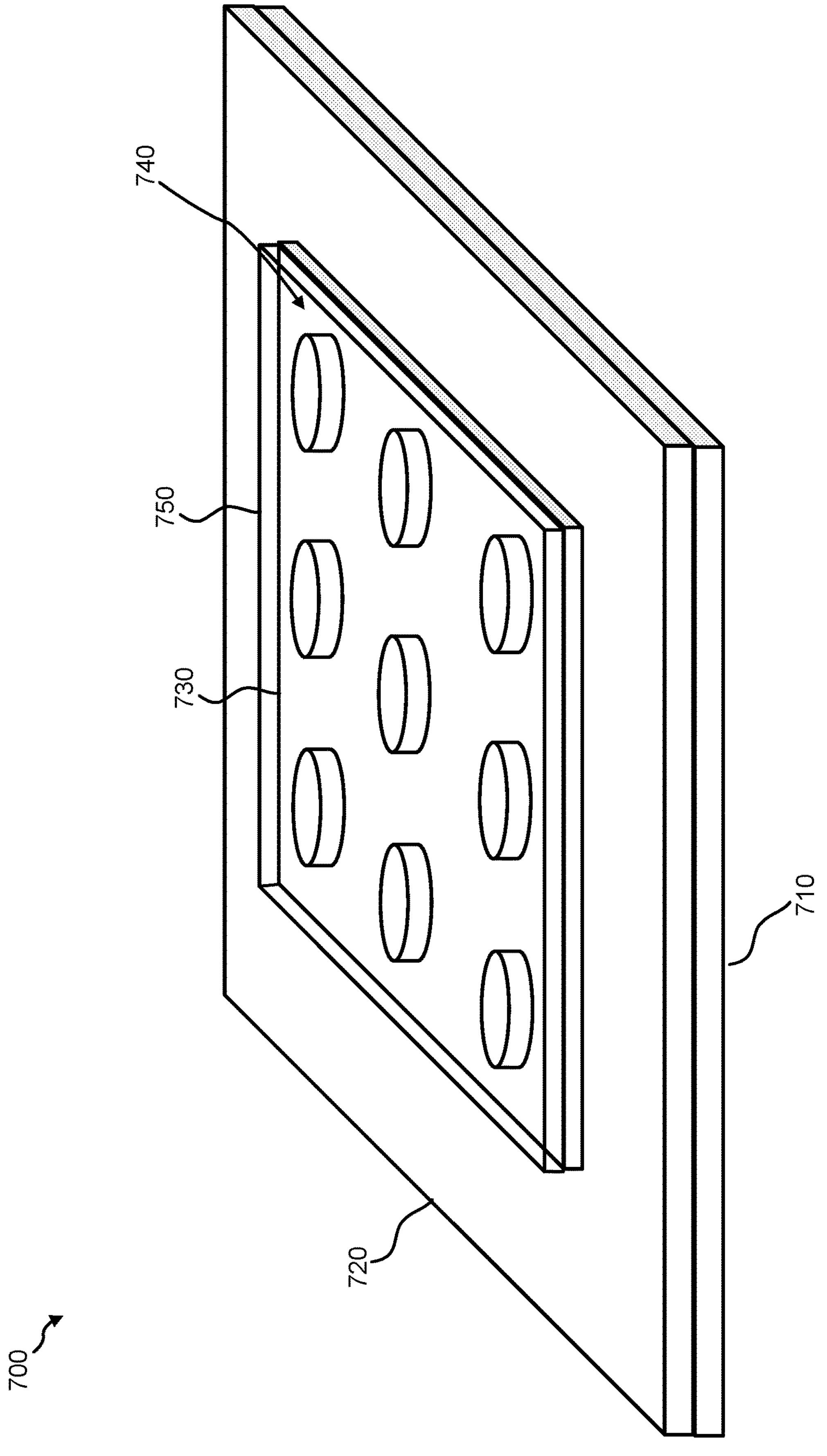
FIG. 7 illustrates a first detector system according to aspects of the present disclosure.

FIG. 7 illustrates a first detector system 700 according to aspects of the present disclosure. In some aspects of the present disclosure, the first detector system 700 may optionally include a substrate 710 configured to provide physical support for the first detector system 700. The first detector system 700 may include a magnet 720 configured to provide a magnetically attractive force to magnetic particles (not shown). The first detector system 700 may include a semiconductor sensor substrate 730 having sensors for measuring the magnetic particles. The first detector system 700 may include one or more enclosures 740 having magnetic particles and/or phase change material therein. The one or more enclosures 740 may be optionally encased in a passivation layer 750. The substrates described in this filing could be silicon or glass or laminate or surgical steel or composite or another suitable material depending on the requirements of the application and incorporate different enclosure shapes (for the particles), microfluidic channels etc. depending on the requirements of the application.

Figure 8:
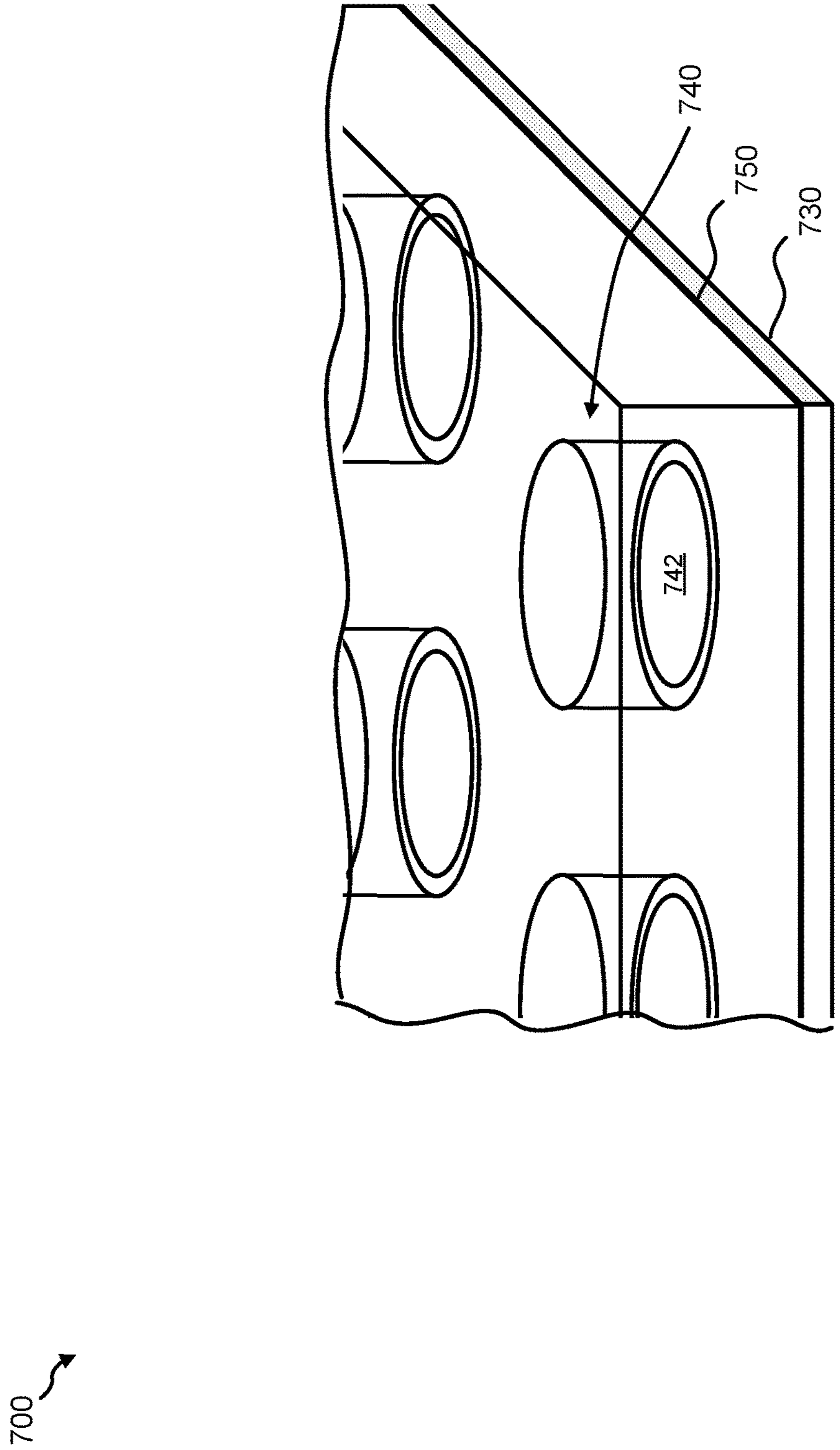
FIG. 8 illustrates a portion of the first detector system according to aspects of the present disclosure.

FIG. 8 illustrates a portion of the first detector system 700 according to aspects of the present disclosure. In an aspect, each of the one or more enclosures 740 of the first detector system 700 may include a sensor 742 configured to detect a change in a location of magnetic/conductive particles (not shown) within the corresponding enclosure. The sensor 742 may be configured to detect changes in magnetic moments, conductivity, weight, luminance, and/or other physical properties that may change when the location of magnetic/conductive particles changes. The sensor 742 may be built directly onto the semiconductor sensor substrate 730. The semiconductor sensor substrate 730 may include other sensors (not shown) for neighboring enclosures of the one or more enclosures 740. The semiconductor sensor substrate 730 may include circuits, logics, and/or program for detecting, analyzing, determining, and/or communicating changes in temperature as detected. The substrates described in this filing could be silicon or glass or laminate or surgical steel or composite or another suitable material depending on the requirements of the application and incorporate different enclosure shapes (for the particles), microfluidic channels etc. and connected to suitable processing circuitry, memory and other functionality depending on the requirements of the application.

In some aspects, each enclosure may include magnetic/conductive particles with different masses and/or different magnetic intensities. As such, if the phase change is gradual and the phase change materials (not shown) change the viscosity gradually, the enclosures with the heavier particles may be activated while the enclosures with the lighter particles may not be activated.

In some aspects, the sensor 742 may be an active sensor or a passive sensor.

In one example and referring to FIGS. 3 and 7, the plurality of magnetic particles 120-1, 120-2 . . . **120-*n* may be disposed in the one or more enclosure 740. Each of the one or more enclosures 740 may include one of the plurality of phase change materials 130-1, 130-2 . . . 130-*n*. Each of the one or more enclosure 740 may include a sensor, such as the sensor 742. Prior to operation, the plurality of magnetic particles 120-1, 120-2 . . . 120-*n* may be disposed in a top portion (away from the semiconductor sensor substrate 730) of the one or more enclosures 740. The plurality of magnetic particles 120-1, 120-2 . . . 120-*n* may be submerged in the plurality of phase change materials 130-1, 130-2 . . . 130-*n*. The plurality of phase change materials 130-1, 130-2 . . . 130-*n*** may be in the solid state.

During operation, the temperature of the first detector system 700 may be at a temperature below the lowest phase transition temperature of the plurality of phase change materials 130-1, 130-2 . . . **130-*n*. As temperature rises, one or more of the plurality of phase change materials 130-1, 130-2 . . . 130-*n* may transition from the solid state to the fluid state. As such, the corresponding magnetic particles of the plurality of magnetic particles 120-1, 120-2 . . . 120-*n* may move toward a bottom portion (toward the semiconductor sensor substrate 730) of the one or more enclosures 740 due to the attractive force of the magnet 720 and/or gravity. Based on which and/or how many sensors detect the magnetic particles, a controller (not shown) may determine the highest temperature reached by the first detector system 700. In some implementations, the first detector system 700** may be reset according to the techniques described above.

Figure 9:
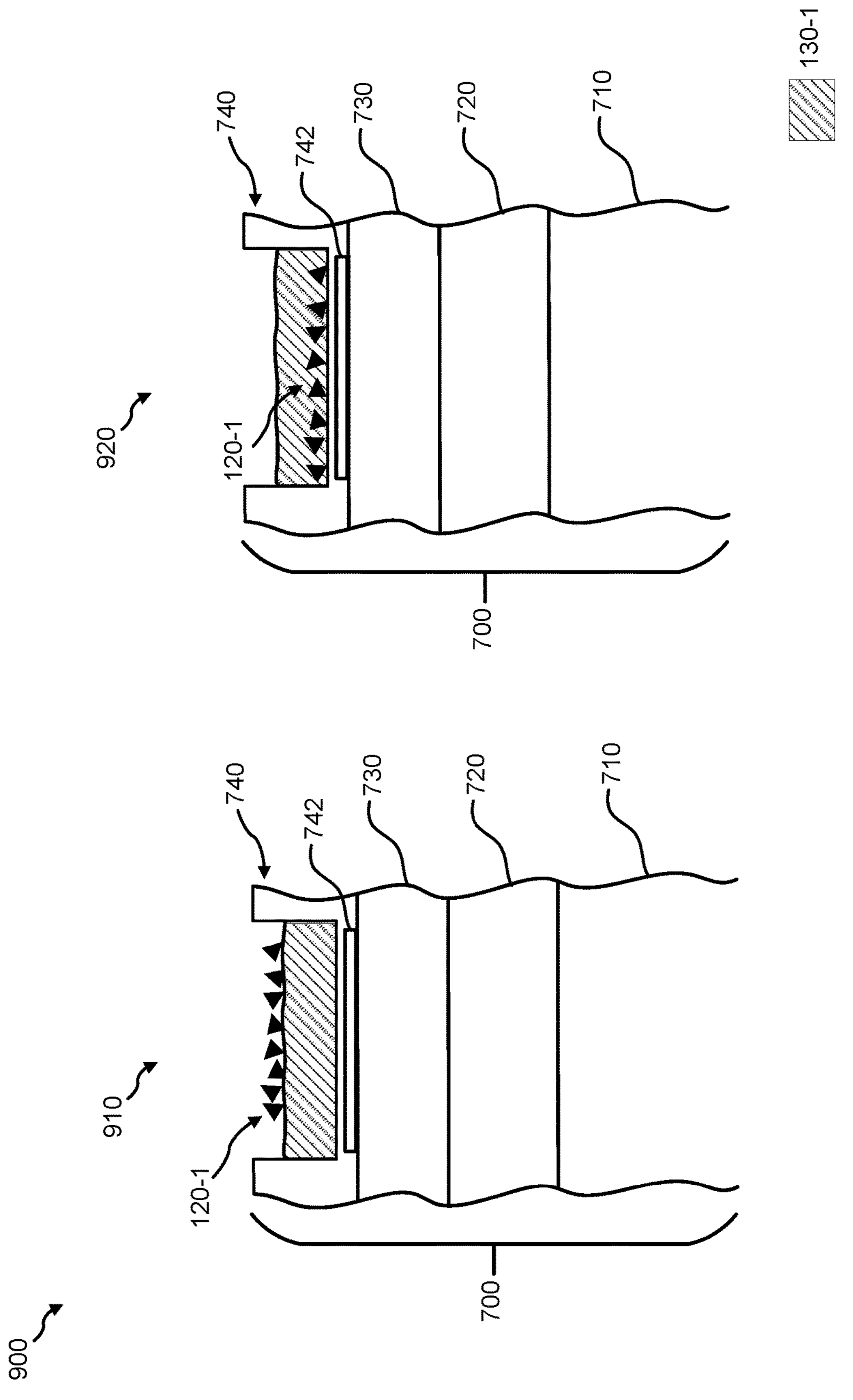
FIG. 9 illustrates an example of a scheme for operating the first detector system according to aspects of the present disclosure.

FIG. 9 illustrates an example of a scheme 900 for operating the first detector system 700 according to aspects of the present disclosure. Referring to FIGS. 1 and 7-9, at 910, the first phase change material 130-1 may be in the solid state. The first magnetic particles 120-1 may be disposed on the surface of the first phase change material 130-1. As such, the sensor 742 may be unable to detect the magnetic moment, the electrical charge, and/or the weight of the first magnetic particles 120-1. At 920, the temperature of the first detector system 700 may rise above the phase transition temperature of the first phase change material 130-1. As such, the first phase change material 130-1 may transition to the fluid state. The first magnetic particles 120-1 may move toward the sensor 742 (due to gravitational force, electrical force, and/or magnetic force). In response, the sensor 742 may be able to detect the magnetic moment, the electrical charge, and/or the weight of the first magnetic particles 120-1.

In one aspect, the magnet 720 may produce mainly an out of plane magnetic field. An magnetic sensor, such as an xMR sensor (e.g., an anisotropic magnetoresistive sensor, a giant magnetoresistive sensor, and/or a tunnel magnetoresistive sensor), may not change resistance in such a field. When the phase change material (e.g., first phase change material 130-1) is still solid, the magnetic particles may be too far away to generate an in-plane field at the sensing elements. When the particles have propagated toward the sensing elements, they may be close enough to produce an out-of-plane magnetic field for detection. Examples of magnetic sensors may include a giant magnetoresistance (GMR) multilayer element. Such an element increases in resistance when the in-plane magnetic field increases independent of field direction. The increase of resistance may be due to the presence of particles, which may be readily detected. In one implementation, a reference resistor for comparison may be provided. The enclosures may be closed by a lid and/or an encapsulation layer. The shape of the sensing element may be a spiral shape, a meander shape, or other suitable shapes. In one aspect, instead of using a thick passivation layer, the enclosures may be generated by bonding a second piece of silicon having deep silicon etched holes.

In other aspects, resistive measurements may be used for detection. Assuming N pits, each of the N pits may have particles of different characteristics (i.e., resistances). There may be N thresholds. There may be an electric contacts connected to the sides and the bottom of each pit. There is a terminal that is connected to the first pit and a terminal connected to the last pit. When the temperature is low, no pits are filled so there is no resistance. When the temperature exceeds the first threshold, the heavier conductive particles of one pit may close a contact. As temperature increases, more switches will close. If each switch closes a branch with a resistor, the value of the global resistance may depend on how many pits are filled. In one alternative aspect, the pits may be arranged as a matrix where each row/column has the same kind of particles to increase robustness (i.e., providing redundancy).

In some aspects, if the sensing element is switch that is closed with the particle, the switch could be connected to an integrated coil. An external alternating current (AC) field may cause a counter reaction when the switch is closed. In another aspect, resistor-inductor-capacitor (RLC) combination having different resonant frequencies for different pits may be implemented. In one aspect, a giant magnetic impedance (GMI) sensor may be used for remote read out.

Figure 10:
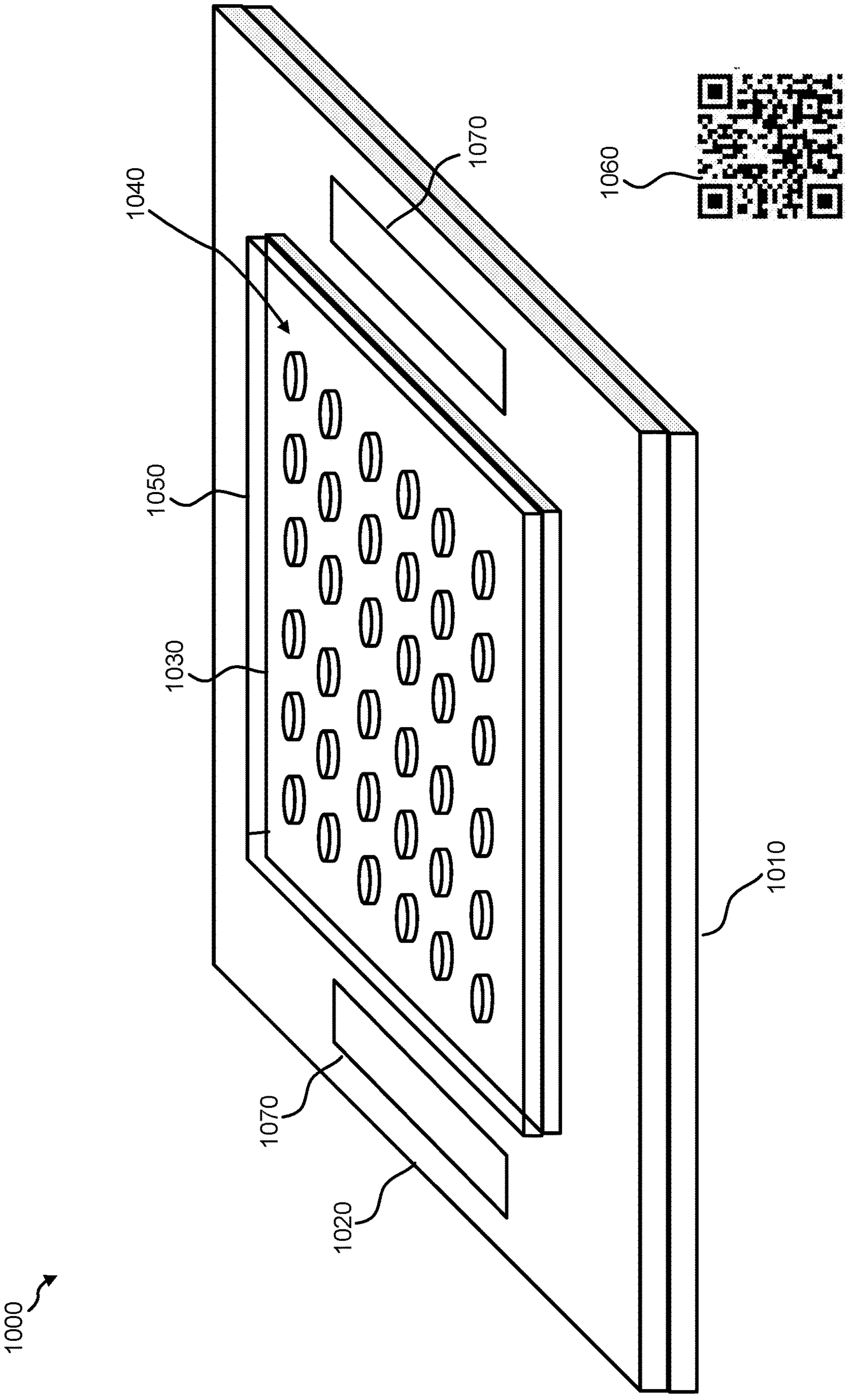
FIG. 10 illustrates an example of a phase change array for asset quality control and/or chain of custody monitoring according to aspects of the present disclosure.

FIG. 10 illustrates an example of a phase change array for asset quality control and/or chain of custody monitoring. In some aspects of the present disclosure, a phase change array 1000 may optionally include a substrate 1010 configured to provide physical support for the phase change array 1000. The phase change array 1000 may include a magnet 1020 configured to provide a magnetically attractive force to magnetic particles (not shown). The phase change array 1000 may include a semiconductor sensor substrate 1030 having sensors for measuring the magnetic particles. The phase change array 1000 may include one or more enclosures 1040 having magnetic particles and/or phase change material therein. The one or more enclosures 1040 may be optionally encased in a passivation layer 1050.

In some aspects of the present disclosure, the magnetic particles in the one or more enclosures 1040 may be arranged in a predetermined pattern across the phase change array 1000. The predetermined pattern may be a code 1060 representing information via the arrangements of the magnetic particles in the one or more enclosures 1040. For example, in some of the one or more enclosures 1040, the magnetic particles may be disposed toward the sensors. In other of the one or more enclosures 1040, the magnetic particles may be disposed away from the sensors. Examples of the code 1060 may include QR code, other spatial codes, or other identification patterns.

In one aspects, the code 1060 may be programmed magnetically. For example, an external system (not shown) may utilize one or more magnets to selectively attract the magnetic particles in each of the one or more enclosures 1040 away from the magnet 1020. Based on some of the magnetic particles disposed away from the sensors and some magnetic particles disposed toward sensors, a unique pattern may be produced for the phase change array 1000.

During operation, a temperature above the phase transition temperature of the phase change material may alter the code 1060. In some aspects, if the temperature of the phase change array 1000 rises above the phase transition temperature of the phase change material in the one or more enclosures 1040, the magnet 1020 may attract the magnetic particles toward the sensors. As a result, the pattern associated with the code 1060 may be destroyed. The destruction of the code 1060 indicates that the phase change array 1000 has being exposed to a temperature above the phase transition temperature of the phase change array 1000.

In one implementation according to aspects of the present disclosure, the phase change array 1000 may be utilized as an encryption and/or decryption key. The sensors of the semiconductor sensor substrate 1030 may detect the magnetic field associated with magnetic particles in the one or more enclosures 1040. Based on the detection of the pattern and/or the strengths of the magnetic field, the encryption and/or the decryption key generated may be difficult and/or impossible to replicate. If the encryption and/or the decryption key is exposed to a temperature indicating possible manipulation or tempering, the encryption and/or the decryption key may be destroyed due to the phase change material melting and the particles changing position. As a result the reading by the sensors will change, invalidating the encryption key. In another implementation, if tempering is detected, the phase change array 1000 may optionally include heating elements to stimulate phase transition to destroy the encryption/decryption key.

In another aspect of the present disclosure, the phase change array 1000 may optionally include heating and/or cooling elements 1070. The one or more enclosures 1040 may require constant heating/cooling to maintain the integrity of the code 1060. In the absence electrical energy being provided to the phase change array 1000, the operation of the heating and/or cooling elements 1070 may be interrupted, causing the destruction of the code 1060 due to the phase change materials changing phases (e.g., transitioning from solid to liquid or vice versa). Examples of heating elements include resistive heaters or other suitable heaters. Examples of cooling elements include thermoelectric cooling devices or other suitable cooling elements.

In one aspect of the present disclosure, the phase change array 1000 may include a shield to magnetically shield external field interference, or be in an arrangement with the sensors disposed outside the magnetic particle area to sense background field.

Figure 11:
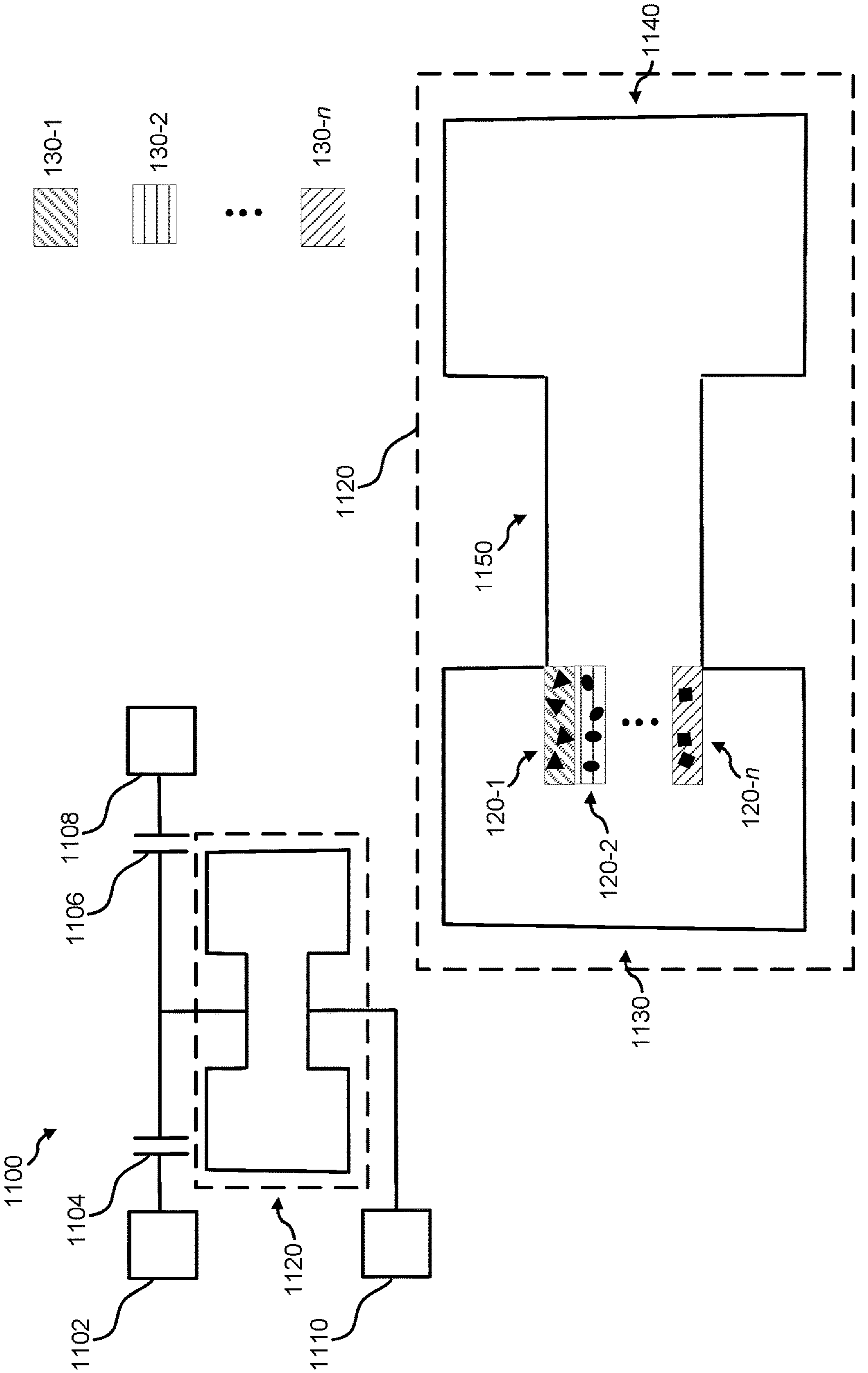
FIG. 11 illustrates an example of a second detector system based on a floating gate charge trap according to aspects of the present disclosure.

FIG. 11 illustrates an example of a second detector system 1100 based on a floating gate charge trap according to aspects of the present disclosure. In some aspects, the second detector system 1100 may include a high voltage terminal 1102 configured to supply a high voltage (e.g., 100 volt (V), 200 V, 500 V, 1000 V, or higher voltage levels). The second detector system 1100 may include a first capacitor 1104 and a second capacitor 1106. The second detector system 1100 may include a first ground terminal 1108 and a second ground terminal 1110.

In certain aspects, the second detector system 1100 may include a sixth container 1120 configured to detect temperature change according to aspects of the present disclosure. The sixth container 1120 may include a first end 1130 having a first pressure. The first end 1130 may include one or more phase change materials, such as the plurality of phase change materials 130-1, 130-2 . . . **130-*n*. The sixth container 1120 may include a second end 1140 having a second pressure lower than the first pressure of the first end 1130. The sixth container 1120 may include a spark-gap area 1150**.

During operation, a voltage difference based on the high voltage terminal 1102 and the second ground terminal 1110 may occur across the spark-gap area 1150. When the spark-gap area 1150 is devoid of particles, no sparking conduction occurs. When one or more of the plurality of phase change materials 130-1, 130-2 . . . **130-*n* transition from the solid state to the fluid state in response to the temperature of the sixth container 1120 rising, particles (e.g., the plurality of magnetic particles 120-1, 120-2 . . . 120-*n*) trapped within the plurality of phase change materials 130-1, 130-2 . . . 130-*n* may move into the spark-gap area 1150 due to the pressure difference between the first end 1130 and the second end 1140. As the particles are pushed into the spark-gap area 1150, the voltage required to cause sparking conduction may decrease. Specifically, the voltage required to cause sparking conduction may be inversely proportional to the number of particles in the spark-gap area 1150**. For example, as the number of particles increase, the voltage required to cause sparking conduction may decrease.

In one aspect of the present disclosure, a controller may determine the temperature reached by the sixth container 1120 based on the voltage utilized to cause sparking conduction in the spark-gap area 1150. As temperature increases, more of the plurality of phase change materials 130-1, 130-2 . . . **130-*n* may transition from the solid state to the fluid state, causing more particles to move into the spark-gap area 1150**. This increase decreases the voltage necessary for spark conduction.

Figure 12A:
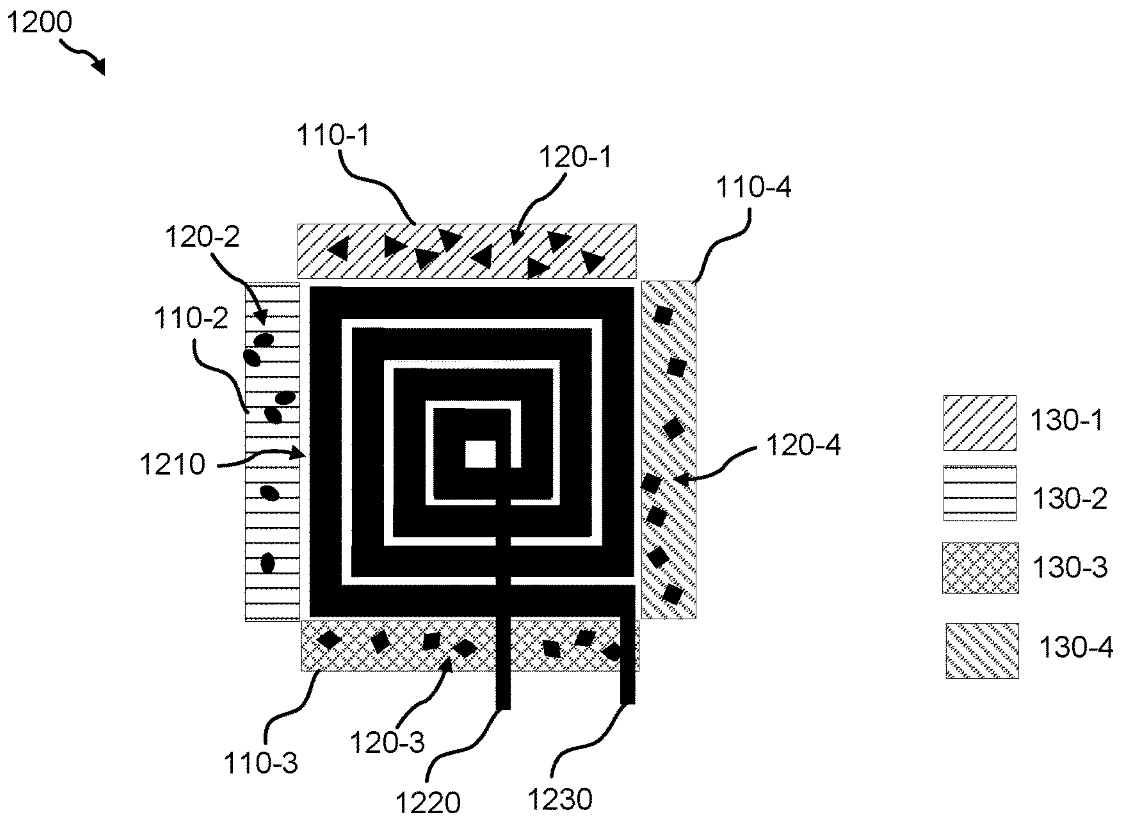
FIGS. 12A-B illustrate examples of a third detector system using a capacitive coil according to aspects of the present disclosure.
Figure 12B:
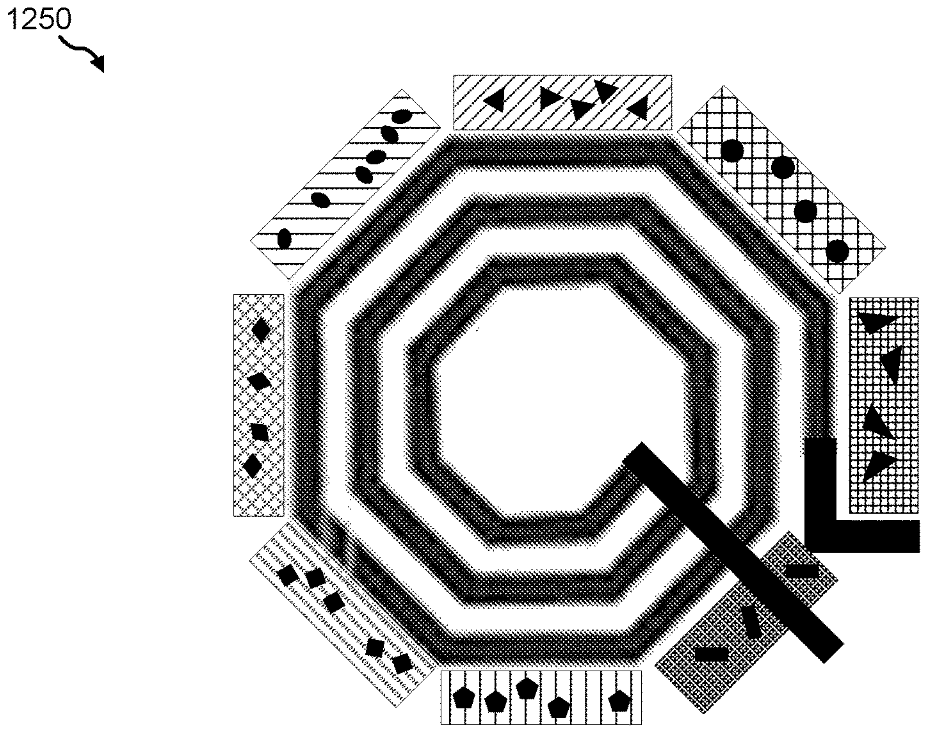

FIGS. 12A-B illustrate examples of a third detector system 1200 using a capacitive or inductive coil structure capable of interacting with (and moving) particles (when they are not constrained by phase change material in a solid state). The third detector system 1200 may include four enclosures 110-1, 110-2, 110-3, 110-4. The third detector system 1200 may include a coil 1210 electrically coupled with a first terminal 1220 and a second terminal 1230. An excitation current (or voltage) may be applied through the coil 1210 via the first terminal 1220 and the second terminal 1230. An electromagnetic field may be generated in response to the excitation current/voltage. The excitation current may excite the magnetic particles 120-1, 120-2, 120-3, 120-4 in their corresponding locations in the phase change materials 130-1, 130-2, 130-3, 130-4 when the phase change materials 130-1, 130-2, 130-3, 130-4 are in the solid state. The excitation behaviors may change when the current excites the magnetic particles 120-1, 120-2, 120-3, 120-4 when the phase change materials 130-1, 130-2, 130-3, 130-4 are in the fluid state. Based on the change in excitation behaviors, a controller (not shown) may be able to detect the phase change of one or more of the phase change materials 130-1, 130-2, 130-3, 130-4, and/or the maximum temperature reached by the third detector system 1200 according to aspects of the present disclosure described above.

In some aspects of the present disclosure, a controller may be configured to provide the excitation current or the excitation voltage. The controller may be configured to determine a temperature or a temperature range reached by the third detector system 1200 based on the movement of the magnetic particles 120-1, 120-2, 120-3, 120-4 caused by the change of phase in any of the phase change materials 130-1, 130-2, 130-3, 130-4. For example, the controller may be configured to identify the resonant frequency of the excitation field (related to the positions of the magnetic particles 120-1, 120-2, 120-3, 120-4) to determine the temperature or the temperature range the third detector system 1200 has been exposed to. Other characteristics of may also be used for this determination.

FIG. 12B shows a different coil construction 1250 with a different shape/no of turns and a different number of containers with particles which delivers a different sensitivity to temperature exposure. The no of turns, containers, size, shape, materials, construction, relative spacing of component parts etc. can be modified and optimized depending on the specific requirements of the application.

Figure 13A:
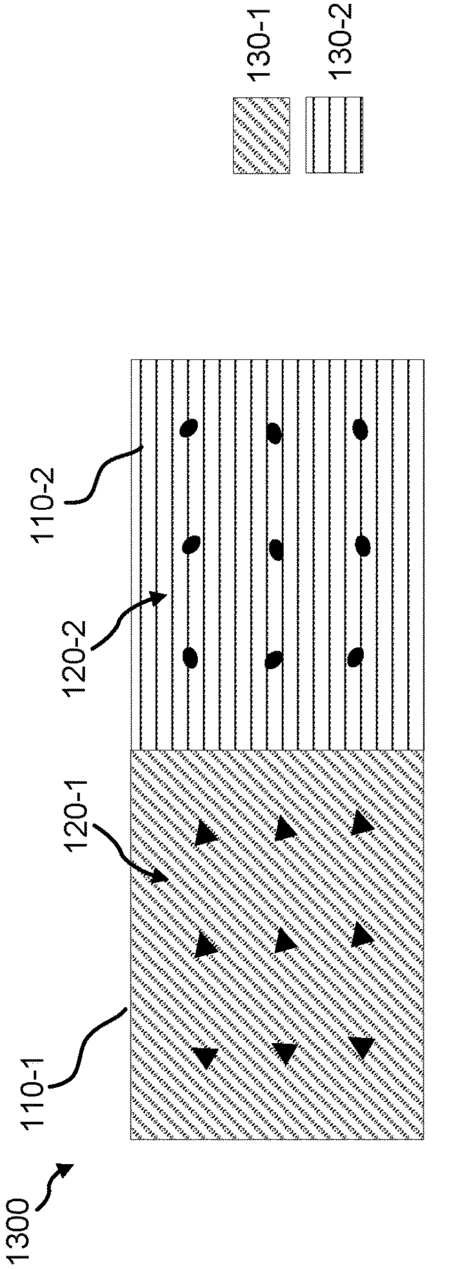
FIGS. 13A-B illustrate an example of fourth detector system based on a visual detection scheme according to aspects of the present disclosure.
Figure 13B:
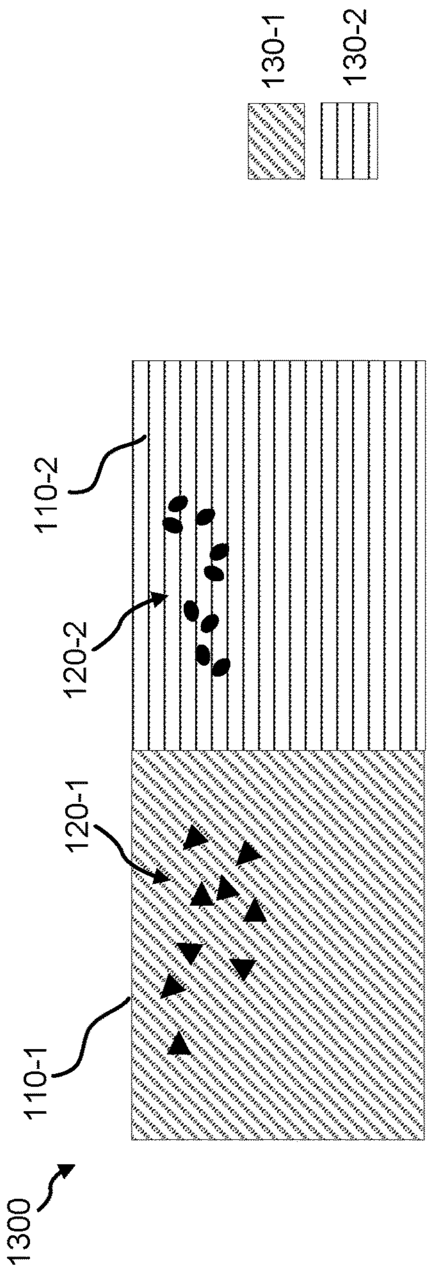

FIGS. 13A-B illustrate an example of fourth detector system 1300 based on a visual detection scheme according to aspects of the present disclosure. The fourth detector system 1300 may include the first enclosure 110-1 having the first magnetic particles 120-1 in the first phase change material 130-1. The fourth detector system 1300 may include the second enclosure 110-2 having the second magnetic particles 120-2 in the second phase change material 130-2.

During operation, the first magnetic particles 120-1 in the first enclosure 110-1 may be arranged in a first pattern (e.g., 3×3). The second magnetic particles 120-2 in the second enclosure 110-2 may be arranged in a second pattern (e.g., 3×3). The temperature of the fourth detector system 1300 may be lowered such that the first phase change material

130-1 and the second phase change material 130-2 transition to the solid state. As such, the first magnetic particles 120-1 and the second magnetic particles 120-2 may be locked in the first pattern and the second pattern, respectfully, as shown in FIG. 13A.

In some aspects, if the temperature of the fourth detector system 1300 rises above the first phase transition temperature of the first phase change material 130-1, the first phase change material 130-1 may transition from the solid state to the fluid state. Consequently, the first magnetic particles 120-1 may not be locked in the first pattern. If the temperature of the fourth detector system 1300 rises above the second phase transition temperature of the second phase change material 130-2, the second phase change material 130-2 may transition from the solid state to the fluid state. Consequently, the second magnetic particles 120-2 may not be locked in the second pattern. This change in patterns is shown in FIG. 13B, which illustrates a scheme for visually detecting temperature changes to the fourth detector system 1300. The size, shape, colour, luminescence, reflectivity, construction and properties of the container and particles can be modified and optimized depending on the specific requirements of the application.

Figure 14A:
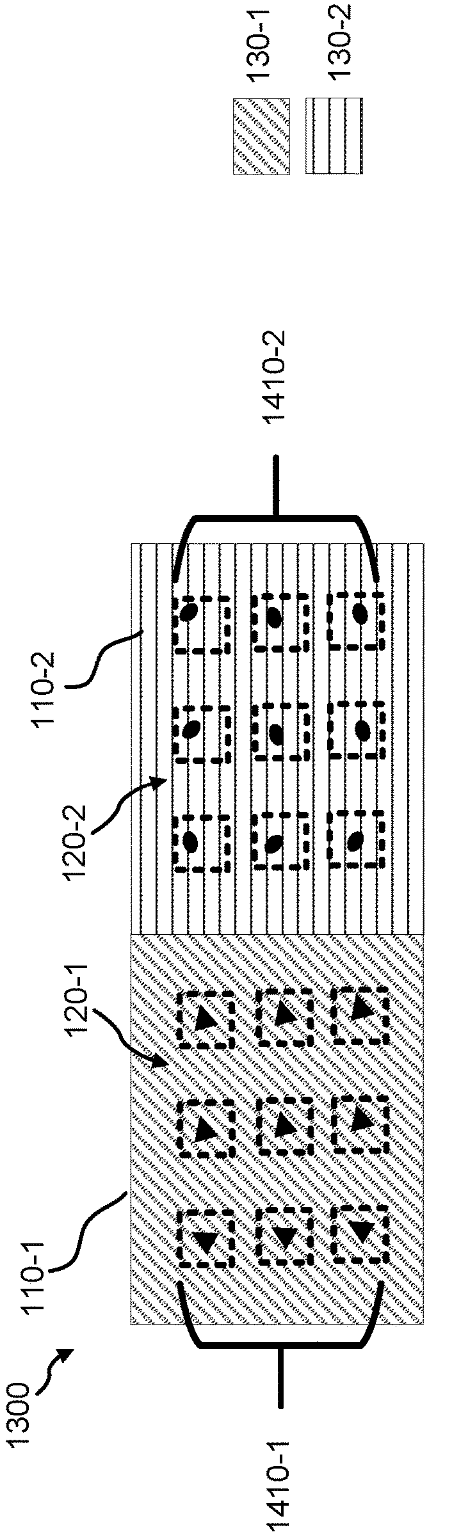
FIGS. 14A-B illustrate an implementation of the fourth detector system according to aspects of the present disclosure.
Figure 14B:
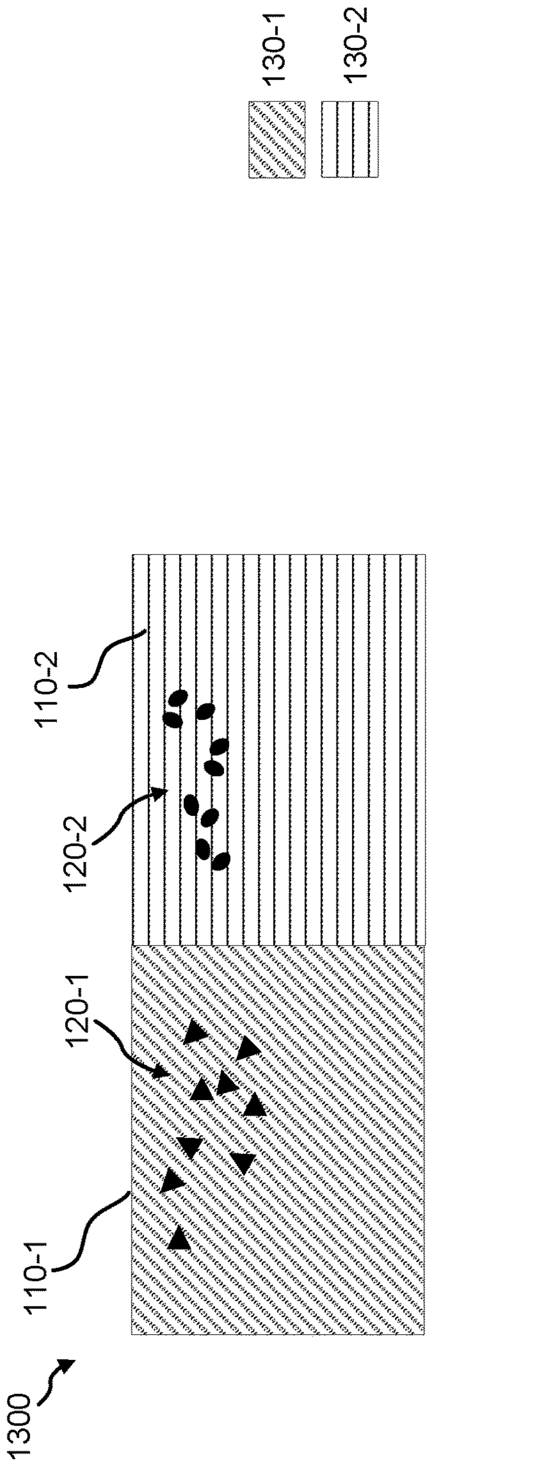

FIGS. 14A-B illustrate an implementation of the fourth detector system 1300 according to aspects of the present disclosure. Here, the fourth detector system 1300 may include a first plurality of magnets 1410-1 associated with the first enclosure 110-1 and a second plurality of magnets 1410-2 associated with the second enclosure 110-2. The first plurality of magnets 1410-1 may be activated when the first phase change material 130-1 is in the fluid phase, and the second plurality of magnets 1410-2 may be activated when the second phase change material 130-2 is in the fluid phase. The activation of the magnets 1410-1, 1410-2 may cause the first magnetic particles 120-1 to be arranged into the first pattern and the second magnetic particles 120-2 to be arranged into the second pattern.

During operation, the first magnetic particles 120-1 and the second magnetic particles 120-2 may be arranged into the first pattern and the second pattern, respectively, when the first phase change material 130-1 and the second phase change material 130-2 are in the fluid state. Next, the temperature of the fourth detector system 1300 may be lowered below the phase transition temperatures of the first phase change material 130-1 and the second phase change material 130-2 to lock the first magnetic particles 120-1 and the second magnetic particles 120-2 into the first pattern and the second pattern, respectively. If the temperature of the fourth detector system 1300 rises above the first phase transition temperature of the first phase change material 130-1, the first magnetic particles 120-1 may no longer be arranged in the first pattern. If the temperature of the fourth detector system 1300 rises above the second phase transition temperature of the second phase change material 130-2, the second magnetic particles 120-2 may no longer be arranged in the second pattern. As such, temperature change may be detected optically and/or visually. The substrates described in this filing could be silicon or glass or laminate or surgical steel or composite or another suitable material depending on the requirements of the application and incorporate different enclosure shapes (for the particles), microfluidic channels etc. depending on the requirements of the application such that relative movement of particles (from initial positions) is optically/visually discernible.

Figure 15:
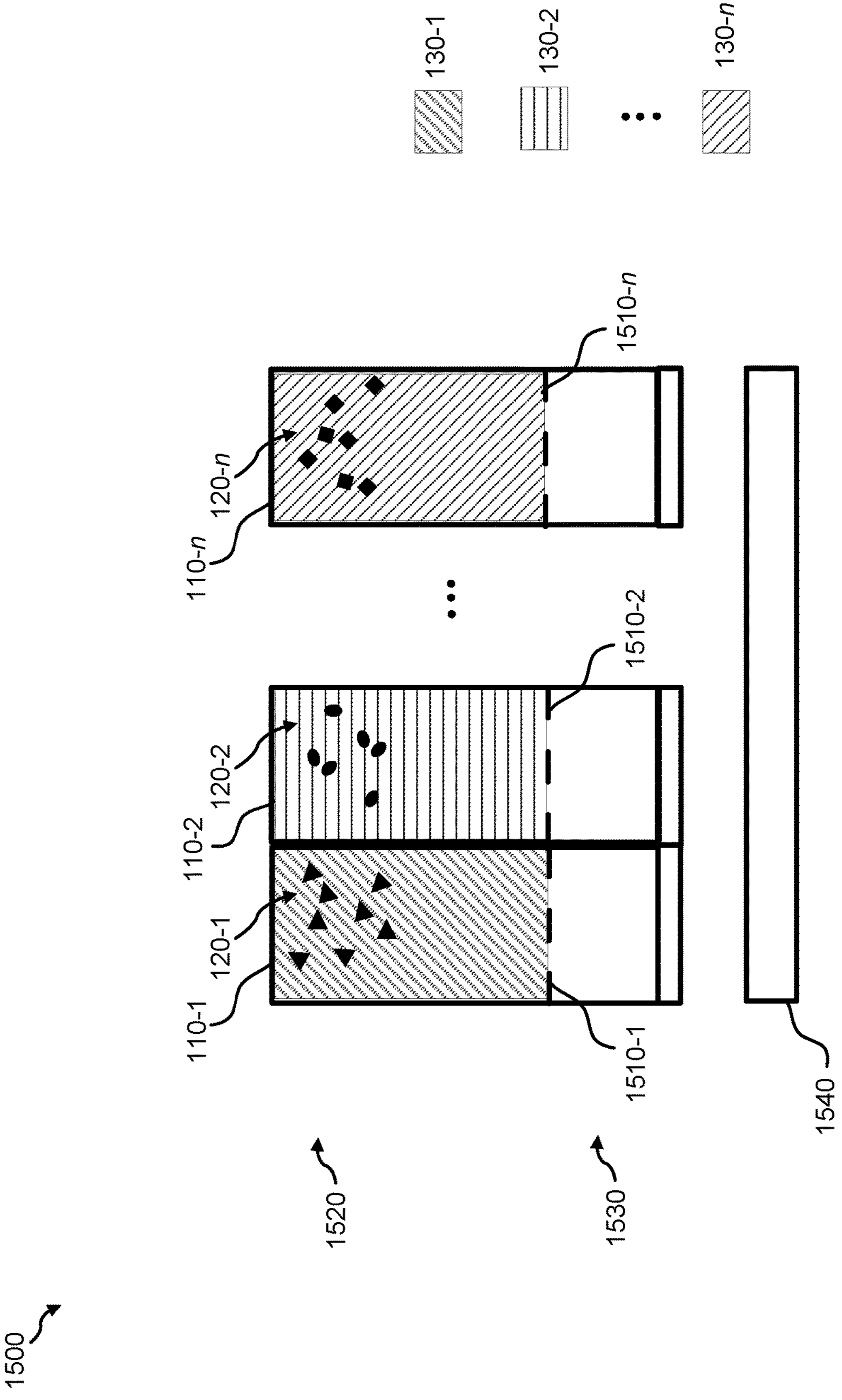
FIG. 15 illustrates a fifth detector system according to aspects of the present disclosure.

FIG. 15 illustrates a fifth detector system 1500 according to aspects of the present disclosure. The fifth detector system 1500 may be configured to detect temperature change based on particles falling into readback cells in response to phase change materials transitioning from the solid state to the fluid state. In some aspects of the present disclosure, the fifth detector system 1500 may include the plurality of enclosures 110-1, 110-2 . . . 110-*n* having the plurality of magnetic particles 120-1, 120-2 . . . 120-*n* immersed in the plurality of phase change materials 130-1, 130-2 . . . 130-*n* similar to implementations described above. Each of the plurality of enclosures 110-1, 110-2 . . . 110-*n* may include a corresponding porous barrier of a plurality of porous barriers 1510-1, 1510-2 . . . 1510-*n* separating the corresponding enclosure into a detection zone 1520 and a readback zone 1530.

In certain aspects, when the plurality of magnetic particles 120-1, 120-2 . . . 120-*n* are disposed in the detection zone 1520 of the plurality of enclosures 110-1, 110-2 . . . 110-*n*, the fifth detector system 1500 is ready for temperature detection. When one or more of the plurality of magnetic particles 120-1, 120-2 . . . 120-*n* are disposed into the readback zone 1530, the fifth detector system 1500 has been exposed to elevated temperatures (e.g., above the phase transition temperature of at least one of the plurality of phase change materials 130-1, 130-2 . . . 130-*n*).

In some aspects, the fifth detector system 1500 may include a sensor substrate 1540 configured to detect the plurality of magnetic particles 120-1, 120-2 . . . 120-*n* in the readout zone 1530 of the plurality of enclosures 110-1, 110-2 . . . 110-*n*. The sensor substrate may be a semiconductor sensor substrate.

During operation, the plurality of magnetic particles 120-1, 120-2 . . . 120-*n* may be disposed in the detection zone 1520 of the plurality of enclosures 110-1, 110-2 . . . 110-*n*. The temperature of the fifth detector system 1500 may be lowered below the phase transition temperatures of the plurality of phase change materials 130-1, 130-2 . . . 130-*n*. Consequently, the plurality of magnetic particles 120-1, 120-2 . . . 120-*n* may be locked in the detection zone 1520 of the plurality of enclosures 110-1, 110-2 . . . 110-*n*. If the temperature of the fifth detector system 1500 increases above the first phase transition temperature of the first phase change material 130-1, the first magnetic particles 120-1 may sink through the first porous barrier 1510-1 into the readback zone of the first enclosure 110-1. The movement may be caused by gravity or other mechanisms.

In one aspect, if the temperature of the fifth detector system 1500 increases above the second phase transition temperature of the second phase change material 130-2, the second magnetic particles 120-2 may sink through the second porous barrier 1510-2 into the readback zone of the second enclosure 110-2, and so forth and so on.

In some aspects, the sensor substrate 1540 may detect one or more of the plurality of magnetic particles 120-1, 120-2 . . . 120-*n* that have sunken into the readback zone 1530 of the plurality of enclosures 110-1, 110-2 . . . 110-*n*. Based on the one or more of the plurality of magnetic particles 120-1, 120-2 . . . 120-*n* that have sunken into the readback zone 1530, the sensor substrate 1540 may be configured to determine the temperature and/or temperature range reached by the fifth detector system 1500.

In certain aspects, the fifth detector system 1500 may be configured to provide a visual indication based on the locations of the plurality of magnetic particles 120-1, 120-2 . . . 120-*n*. In one aspect, the number of magnetic particles in the readback zone 1530 may be a function of the time exposure to temperature above the phase transition temperature of the phase transition material associated with the magnetic particles. The number of magnetic particles may be manually counted, and/or electrically counted, to determine the duration of the exposure. In some aspects, different sized particles may be used in duplicate phase change enclosures. Additional resolution may be achieved with redundant cells with differential readback and/or different particle sizes or porous materials.

In certain aspects, the readback by the sensor substrate 1540 may be based on magnetic and/or conductive patterns.

Figure 16:
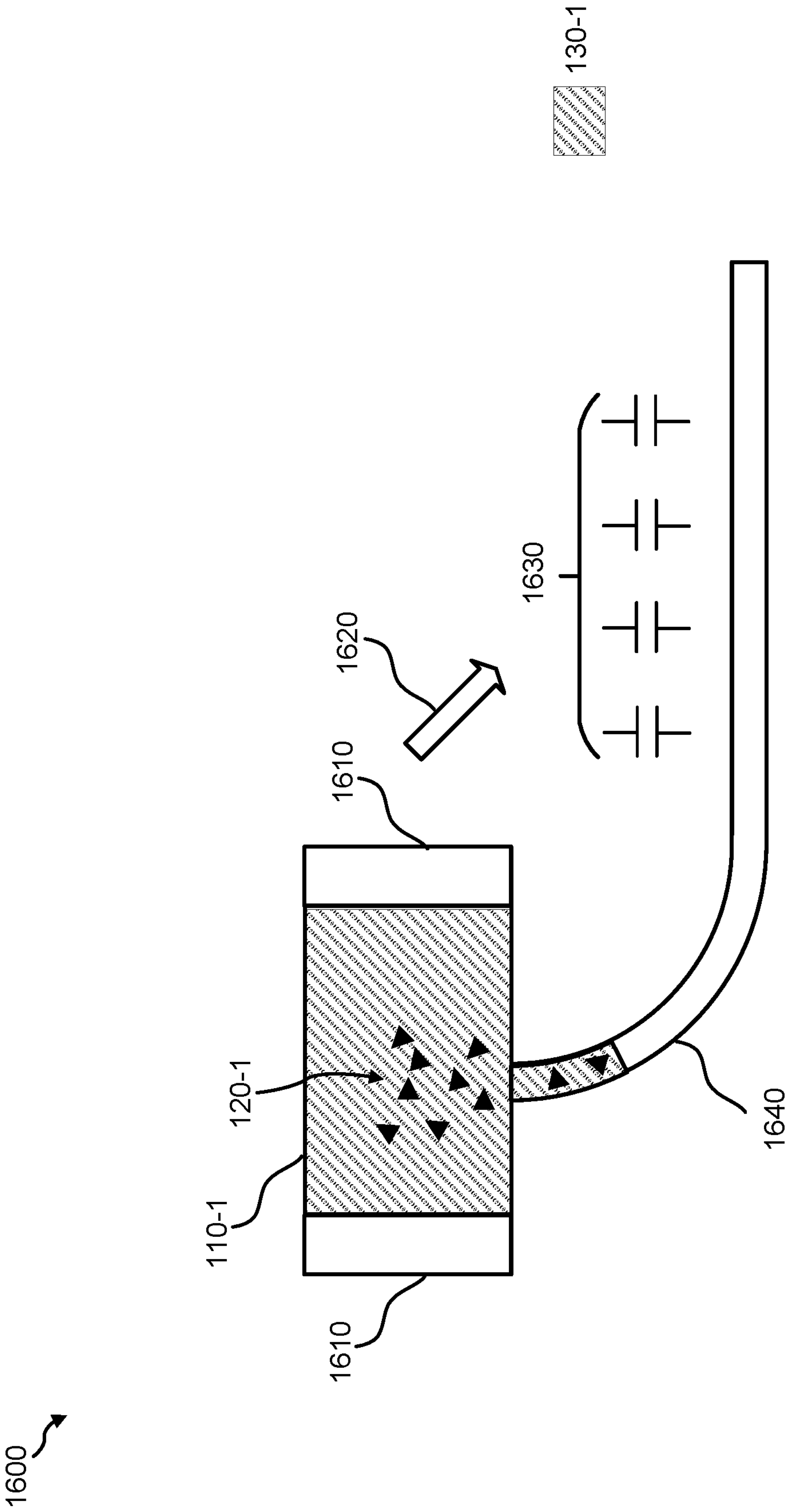
FIG. 16 illustrates an example of implementing energy harvesting using a sixth detector system according to aspects of the present disclosure.

FIG. 16 illustrates an example of implementing energy harvesting of a sixth detector system 1600 according to aspects of the present disclosure. The sixth detector system 1600 may include one or more thermal electric devices 1610 configured to harvest thermal energy from the first phase change material 130-1 in the first enclosure 110-1. The one or more thermal electric devices 1610 may be configured to convert thermal energy to electrical energy 1620. The one or more thermal electric devices 1610 may be configured to send the electrical energy 1620 to one or more sensors 1630 configured to measure phase change. The one or more thermal electric devices 1610 may include pyroelectrical materials.

During operation, the temperature of the first enclosure 110-1 may rise above the phase transition temperature of the first phase change material 130-1. As such, the first magnetic particles 120-1 may be pushed out of the first enclosure 110-1 into a channel 1640. The one or more thermal electric devices 1610 may harvest thermal energy from the first phase change material 130-1, and send the converted electrical energy 1620 (from the harvested thermal energy) to the one or more sensors 1630. The one or more sensors 1630 may measure an electric/magnetic field generated by at least a portion of the first magnetic particles 120-1 being disposed in the channel 1640 and/or moving through the channel 1640.

Figure 17A:
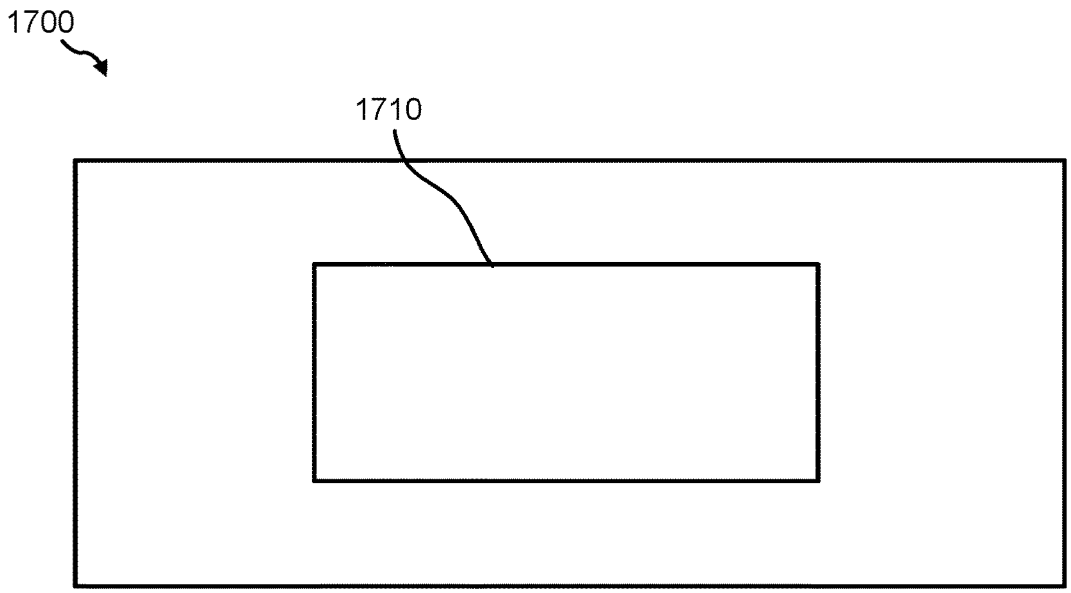
FIGS. 17A-B illustrate an example of a detection package according to aspects of the present disclosure.
Figure 17B:
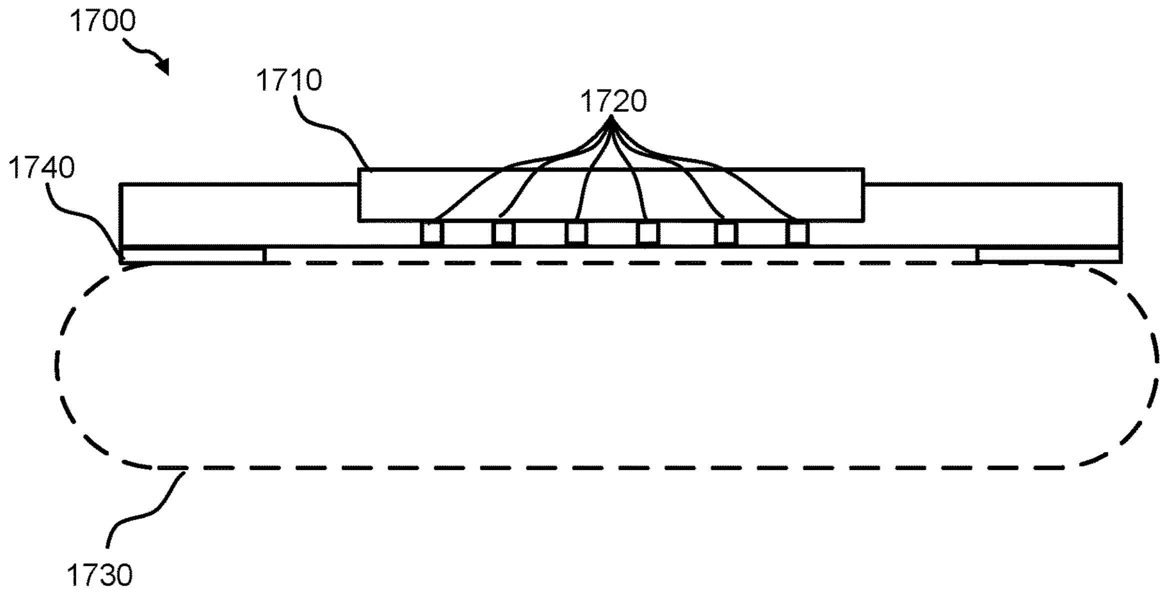

FIGS. 17A-B illustrate an example of a detection package (or device) 1700 according to aspects of the present disclosure. In some aspects of the present disclosure, the detection package 1700 may include a detector system 1710, such as one of the detector systems 700, 1100, 1200, 1300, 1500, 1600, coupled to the detection package 1700. In some aspects, the detector system 1710 may be removably coupled to the detection package 1700 for reuse. The detection package 1700 may include one or more thermal vias 1720 configured to provide thermal conduction channels between the detector system 1710 and an object 1730 to be tracked. The object 1730 may include temperature sensitive materials that require continuous temperature monitoring as described above, such as vaccine, food, medicine, alcoholic beverage, chemicals, etc. An application for the detection package or device 1700 relates to the constructions of a miniature "system" containing variants of the temperature monitoring embodiments described elsewhere that can be attached to a package or asset or object. The detector system 1710 can contain RFID asset tracking, sensing structures, enclosures with phase change material, processing circuitry, encryption capability and other functionality depending on the specific requirements of the application. The size, location, shape of the thermal vias between the object to me monitored and the detector system 1710 can also be modified depending on the requirements of the application.

In optional aspects of the present disclosure, the detection package 1700 may include flexible adhesives 1740 for coupling the detection package 1700 to the object 1730. In optional aspects, the detection package 1700 and/or the detector system 1710 may be flexible.

Figure 18:
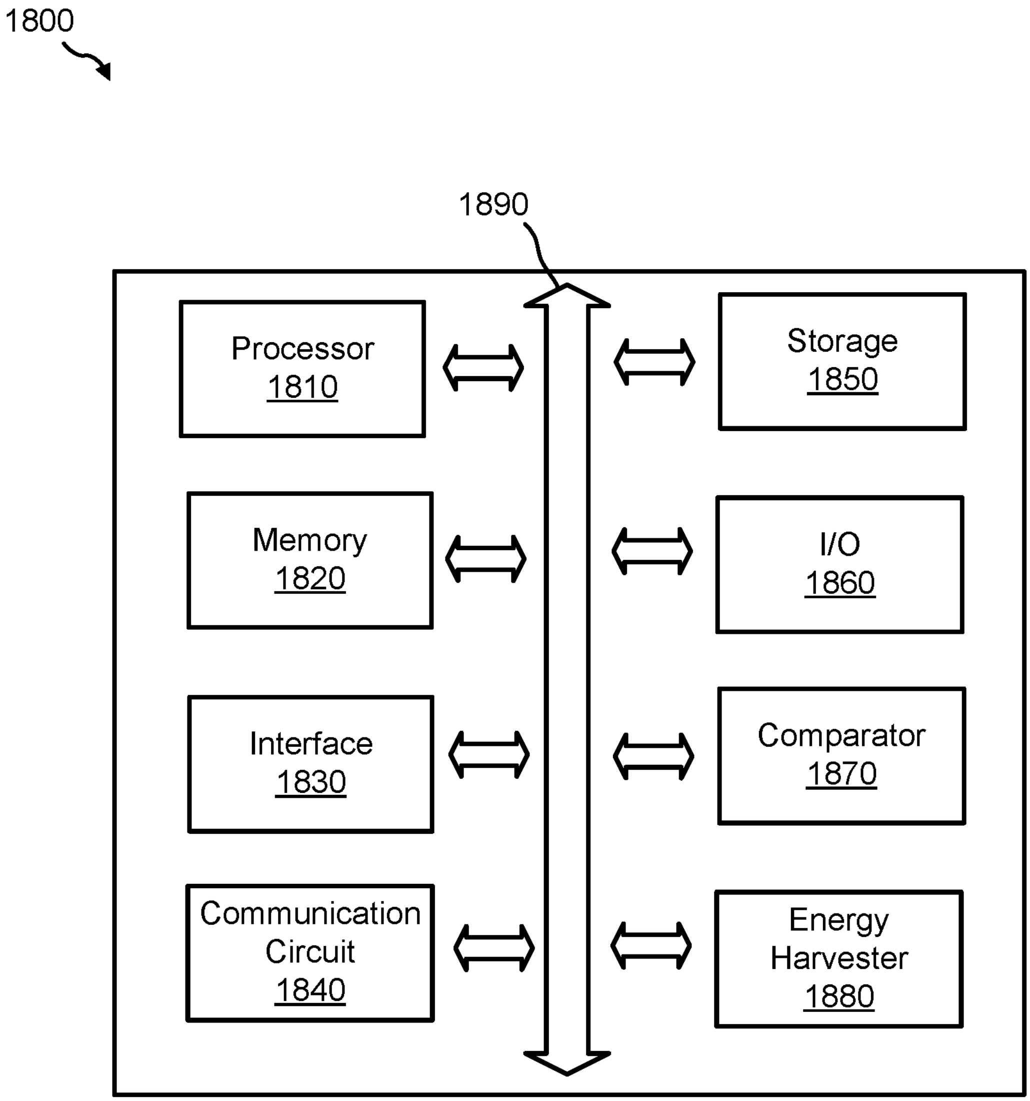
FIG. 18 illustrates an example of a controller for operating detector or detector system described above according to aspects of the present disclosure.

FIG. 18 illustrates an example of a controller 1800 for operating detector or detector system described above according to aspects of the present disclosure. The controller 1800 may be in a single package or as a chip set assembly with multiple components. The controller 1800 may include a processor 1810 configured to execute instructions stored in a memory 1820. The memory 1820 may include computer executable instructions. The controller 1800 may include an interface circuit 1830 configured to provide a hardware interface with external devices. The controller 1800 may include a communication circuit 1840 configured to communicate via wired or wireless communication channels. The controller 1800 may include a storage 1850 configured to store digital information. The controller 1800 may include an input/output (I/O) interface device 1860 configured to receive input signals and/or transmit output signals.

In some aspects of the present disclosure, the controller 1800 may include a comparator 1870 configured to detect a change in the particles caused by change in temperature and/or phase change of the phase change material. For example, the comparator 1870 may be configured to compare the magnetic responses of the magnetic particles at different locations within the enclosures. The comparator 1870 may be configured to compare the electrical responses (e.g., conductance) of the magnetic particles at different locations within the enclosures. The comparator 1870 may be configured to compare the optical images of the magnetic particles at different locations within the enclosures.

In one example implementation, the comparator 1870 may be configured receive first measured signals associated with the magnetic responses of the magnetic particles when the phase change material is in the solid state. The comparator 1870 may be configured to store (locally, in the memory 1820, and/or in the storage 1850) the first measured signals as the "baseline" signals (i.e., indicating that the phase change material has not reached the phase transition temperature). The comparator 1870 may be configured to receive second measured signals associated with the magnetic responses of the magnetic particles when the phase change material experiences different temperatures. The comparator 1870 may compare the second measured signals against the first measured signals to determine whether the phase change material has experienced any temperature above the phase transition temperature based on the comparison.

In one aspect, the controller 1800 may include an energy harvester 1880 configured to harvest energy from a variety of sources and to convert the harvested energy into electrical energy. The energy harvester 1880 may include one or more of a kinetic energy harvester, a vibrational harvester, a radio frequency (RF) harvester, a photovoltaic energy harvester, a thermal energy harvester, and/or other types of energy harvester. The controller 1800 may include a bus 1890 configured to provide connections among the subcomponents of the controller 1800. The system can be set up such that the energy harvesting capability incorporated enables an intermittent power up and data recording (or transmitting/transferring) over time.

Figure 19:
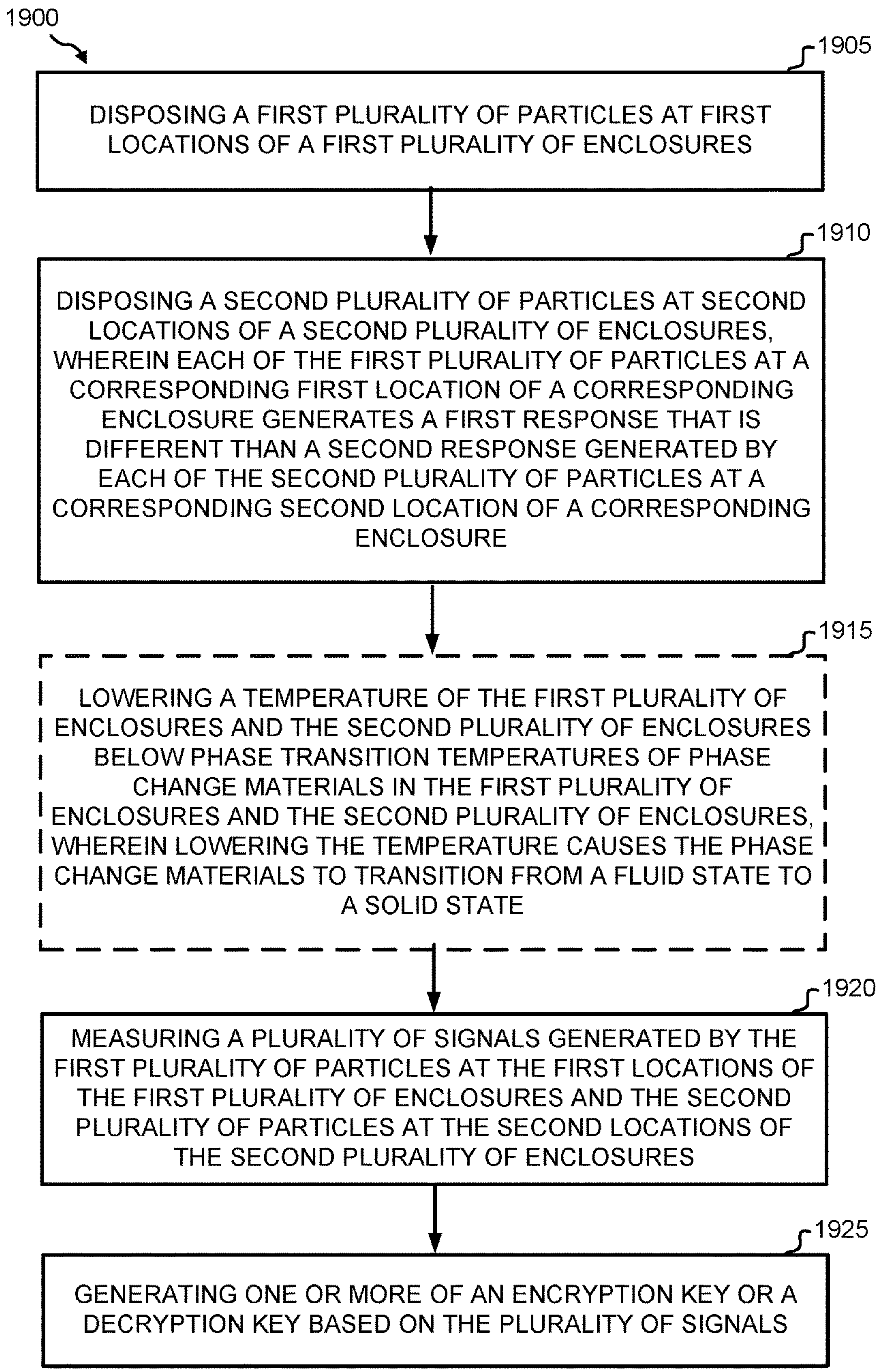
FIG. 19 illustrates an example of a method for implementing a digital ledger according to aspects of the present disclosure.

FIG. 19 illustrates an example of a method 1900 for implementing a digital ledger according to aspects of the present disclosure. The method 1900 may be implemented by the first detector system 700, the phase change array 1000, the controller 1800, and/or one or more subcomponents of the first detector system 700, the phase change array 1000, or the controller 1800.

At 1905, the method 1900 may include disposing a first plurality of particles at first locations of a first plurality of enclosures. For example, the magnets 1410, the magnet 1020, the first detector system 700, the phase change array 1000, and/or the controller 1800 may be configured to, and/or define means for disposing a portion of the plurality of magnetic particles 120-1, 120-2 . . . 120-*n* toward the sensor 742 of the enclosures.

At 1910, the method 1900 may include disposing a second plurality of particles at second locations of a second plurality of enclosures, wherein each of the first plurality of particles at a corresponding first location of a corresponding enclosure generates a first response that is different than a second response generated by each of the second plurality of particles at a corresponding second location of a corresponding enclosure. For example, the magnets 1410, the magnet 1020, the first detector system 700, the phase change array 1000, and/or the controller 1800 may be configured to, and/or define means for disposing a remaining portion of the plurality of magnetic particles 120-1, 120-2 . . . 120-*n* away from the sensor 742 of the enclosures.

At 1915, the method 1900 may optionally include lowering a temperature of the first plurality of enclosures and the second plurality of enclosures below phase transition temperatures of phase change materials in the first plurality of enclosures and the second plurality of enclosures, wherein lowering the temperature causes the phase change materials to transition from a fluid state to a solid state. For example, the heating/cooling elements 1070 in the phase change array 1000, the first detector system 700, the phase change array 1000, and/or the controller 1800 may be configured to, and/or define means for lowering the temperature of the enclosures 1040 to cause the phase change materials 130-1, 130-2 . . . 130-*n* to transition to the solid state.

At 1920, the method 1900 may include measuring a plurality of signals generated by the first plurality of particles at the first locations of the first plurality of enclosures and the second plurality of particles at the second locations of the second plurality of enclosures. For example, the sensors 742, the sensor substrate 1030, the first detector system 700, the phase change array 1000, and/or the controller 1800 may be configured to, and/or define means for measuring the electrical and/or magnetic signals generated by the sensors 742 measuring the conductance and/or magnetic responses of the plurality of magnetic particles 120-1, 120-2 . . . 120-*n*.

At 1925, the method 1900 may include generating one or more of an encryption key or a decryption key based on the plurality of signals. For example, the sensor substrate 1030, the first detector system 700, the phase change array 1000, and/or the controller 1800 may be configured to, and/or define means for generating an encryption key and/or a decryption key based on the measured signals.

In summary, implementations of the present disclosure may include one or any combination of the following aspects.

Aspects of the present disclosure include an array including a plurality of enclosures, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, a plurality of particles disposed in the plurality of enclosures, and a sensor substrate having a plurality of sensors electrically coupled with the sensor substrate, where each of the plurality of sensors is configured to measure a corresponding set of particles in a corresponding enclosure and detect a first response associated with the corresponding set of particles in a first location within the corresponding enclosure, and a second response associated with the corresponding set of particles in a second location within the corresponding enclosure, wherein the first location and the second location are different.

Aspects of the present disclosure include the array above, wherein the plurality of particles are conductive particles or magnetic particles.

Aspects of the present disclosure include any of the arrays above, further comprises a magnet configured to attract or repel the plurality of particles.

Aspects of the present disclosure include any of the arrays above, wherein each sensor is further configured to detect magnetic responses associated with at least a portion of the plurality of particles.

Aspects of the present disclosure include any of the arrays above, further comprises one or more of heating elements or cooling elements.

Aspects of the present disclosure include any of the arrays above, further comprises a passivation layer covering the plurality of enclosures.

Aspects of the present disclosure include any of the arrays above, wherein the plurality of sensors are disposed at the bottom of the plurality of enclosures.

Aspects of the present disclosure include any of the arrays above, wherein each of the plurality of enclosures includes a phase change material that is different than remaining phase change materials of the plurality of phase change materials.

Aspects of the present disclosure include any of the arrays above, further comprises a plurality of electrical contacts in the plurality of enclosures, wherein each sensor is further configured to detect a conductance associated with at least a portion of the plurality of particles.

Aspects of the present disclosure include any of the arrays above, wherein each of the plurality of sensors include a giant magnetoresistance (GMR) element.

Aspects of the present disclosure include any of the arrays above, further comprises a reference sensor configured to measure a reference resistor.

Aspects of the present disclosure include any of the arrays above, further comprises adhesive pads configured to removably attach the array to an object.

Aspects of the present disclosure include any of the arrays above, further comprises a support substrate having thermal conduction pathways configured to provide thermal conduction between the array and an object.

Aspects of the present disclosure include an array including a support substrate having thermal conduction pathways configured to provide thermal conduction between the array and an object, a plurality of enclosures, a plurality of phase change materials each disposed in a corresponding enclosure of the plurality of enclosures, wherein each of the plurality of enclosures includes a phase change material having a phase transition temperature that is different than remaining phase transition temperatures of remaining phase change materials of the plurality of phase change materials, a plurality of magnetic particles disposed in the plurality of enclosures, and a sensor substrate having a plurality of sensors electrically coupled with the sensor substrate, where each of the plurality of sensors is configured to measure a corresponding set of magnetic particles in a corresponding enclosure and detect a first magnetic response associated with the corresponding set of magnetic particles in a first location within the corresponding enclosure, and a second magnetic response associated with the corresponding set of magnetic particles in a second location within the corresponding enclosure, wherein the first location and the second location are different.

Aspects of the present disclosure include the array above, further comprises a magnet configured to attract or repel the plurality of magnetic particles.

Aspects of the present disclosure include any of the arrays above, further comprises one or more of heating elements or cooling elements.

Aspects of the present disclosure include any of the arrays above, further comprises a passivation layer covering the plurality of enclosures.

Aspects of the present disclosure include any of the arrays above, wherein the plurality of sensors are disposed at the bottom of the plurality of enclosures.

Aspects of the present disclosure include any of the arrays above, wherein each of the plurality of sensors include a giant magnetoresistance (GMR) element.

A temperature tracking system including a plurality of arrays removably attached to a plurality of objects, each array of the plurality of arrays includes: a support substrate having thermal conduction pathways configured to provide thermal conduction between the array and a corresponding object of the plurality of objects, a plurality of enclosures, a plurality of phase change materials each disposed in a corresponding enclosure of the plurality of enclosures, wherein each of the plurality of enclosures includes a phase change material having a phase transition temperature that is different than remaining phase transition temperatures of remaining phase change materials of the plurality of phase change materials, a plurality of magnetic particles disposed in the plurality of enclosures, and a sensor substrate having a plurality of sensors electrically coupled with the sensor substrate, where each of the plurality of sensors is configured to measure a corresponding set of magnetic particles in a corresponding enclosure and detect a first magnetic response associated with the corresponding set of magnetic particles in a first location within the corresponding enclosure, and a second magnetic response associated with the corresponding set of magnetic particles in a second location within the corresponding enclosure, wherein the first location and the second location are different, a magnet configured to attract or repel the plurality of magnetic particles, and a controller configured to determine a temperature or a temperature range reached by each of the plurality of objects based on measurements by each corresponding plurality of sensors.

Aspects of the present disclosure include a method of implementing a digital ledger including disposing a first plurality of particles at first locations of a first plurality of enclosures, disposing a second plurality of particles at second locations of a second plurality of enclosures, wherein each of the first plurality of particles at a corresponding first location of a corresponding enclosure generates a first response that is different than a second response generated by each of the second plurality of particles at a corresponding second location of a corresponding enclosure, measuring a plurality of signals generated by the first plurality of particles at the first locations of the first plurality of enclosures and the second plurality of particles at the second locations of the second plurality of enclosures, and generating one or more of an encryption key or a decryption key based on the plurality of signals.

Aspects of the present disclosure include the method above, further comprises lowering, after disposing the first plurality of particles and the second plurality of particles, a temperature of the first plurality of enclosures and the second plurality of enclosures below phase transition temperatures of phase change materials in the first plurality of enclosures and the second plurality of enclosures, wherein lowering the temperature causes the phase change materials to transition from a fluid state to a solid state.

Aspects of the present disclosure include any of the methods above, further comprises activating one or more cooling elements to lower the temperature.

Aspects of the present disclosure include any of the methods above, further comprises maintaining the lowered temperature using the one or more cooling elements to prevent at least a portion of the phase change materials to transition the solid state to the fluid state.

Aspects of the present disclosure include any of the methods above, further comprises detecting a tampering of the encryption key or the decryption key, or an attempt to tamper with the encryption key or the decryption key and activating one or more heating elements to transition at least a portion of the phase change materials from the solid state to the fluid state.

Aspects of the present disclosure include any of the methods above, further comprises resetting the digital ledger by activating one or more heating elements to transition at least a portion of the phase change materials from the solid state to the fluid state.

Aspects of the present disclosure include any of the methods above, further comprises shielding the digital ledger with a shield.

Aspects of the present disclosure include any of the methods above, wherein the plurality of signals is associated with a spatial code.

Aspects of the present disclosure include a digital ledger including a first plurality of enclosures, a second plurality of enclosures, a first plurality of particles disposed at first locations of the first plurality of enclosures, a second plurality of particles disposed at second locations of the second plurality of enclosures, wherein each of the first plurality of particles at a corresponding first location of a corresponding enclosure generate a first response that is different than a second response generated by each of the second plurality of particles at a corresponding second location of a corresponding enclosure, and a plurality of sensors configured to measure a plurality of signals generated by the first plurality of particles at the first locations of the first plurality of enclosures and the second plurality of particles at the second locations of the second plurality of enclosures, wherein the plurality of signals is used to identify the digital ledger.

Aspects of the present disclosure include the digital ledger above, further comprises a sensor substrate configured to generate one or more of an encryption key or a decryption key based on the plurality of signals.

Aspects of the present disclosure include any of the digital ledgers above, wherein the plurality of particles are magnetic particles.

Aspects of the present disclosure include any of the digital ledgers above, further comprises a magnet configured to attract or repel the plurality of particles.

Aspects of the present disclosure include any of the digital ledgers above, wherein each sensor is further configured to detect magnetic responses associated with at least a portion of the first plurality of particles.

Aspects of the present disclosure include any of the digital ledgers above, further comprises one or more of heating elements or one or more cooling elements.

Aspects of the present disclosure include any of the digital ledgers above, wherein the plurality of signals is associated with a spatial code.

Aspects of the present disclosure include any of the digital ledgers above, wherein each of the plurality of sensors include a giant magnetoresistance (GMR) element.

Aspects of the present disclosure include a digital ledger including a support substrate, a plurality of enclosures arranged into an array on the support substrate, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, a plurality of magnetic particles disposed throughout a portion of the plurality of enclosures to spatially form a pattern across the array, a plurality of sensors configured to measure a plurality of signals generated by the plurality of magnetic particles, and a sensor substrate configured to: detect the pattern based on the plurality of signals, and generate one or more of an encryption key or a decryption key based on the pattern Aspects of the present disclosure include the digital ledger above, further comprises at least one magnet configured to attract or repel the plurality of magnetic particles.

Aspects of the present disclosure include any of the digital ledgers above, further comprises one or more of heating elements configured to erase the pattern by increase a temperature of at least a subset of the plurality of enclosures above corresponding phase transition temperatures of the corresponding phase change materials.

Aspects of the present disclosure include any of the digital ledgers above, further comprises one or more cooling elements configured to maintain the pattern by keeping a temperature of at least a subset of the plurality of enclosures below corresponding phase transition temperatures of the corresponding phase change materials.

Aspects of the present disclosure include a visual indicator including a plurality of enclosures, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, and a plurality of particles disposed in the plurality of enclosures, wherein corresponding particles disposed in a first location of an enclosure of the plurality of enclosures are configured to display a first visual signal and the corresponding particles disposed in a second location of the enclosure are configured to display a second visual signal.

Aspects of the present disclosure include the visual indicator above, wherein the plurality of particles are magnetic particles.

Aspects of the present disclosure include any of the visual indicators above, wherein each of plurality of enclosures includes a plurality of magnets configured to attract the corresponding particles into the first location of the corresponding enclosure.

Aspects of the present disclosure include any of the visual indicators above, wherein the first visual signal from the enclosure indicates a corresponding phase change material in the enclosure is in a solid state and the second visual signal from the enclosure indicates the corresponding phase change material in the enclosure is in a fluid state.

Aspects of the present disclosure include any of the visual indicators above, wherein the corresponding particles disposed in the first location of the enclosure comprises the corresponding particles disposed in an array pattern.

Aspects of the present disclosure include any of the visual indicators above, wherein each of the plurality of enclosures includes a phase change material that is different than remaining phase change materials of the plurality of phase change materials.

Aspects of the present disclosure include any of the visual indicators above, further comprises adhesive pads configured to removably attach the visual indicator to an object.

Aspects of the present disclosure include any of the visual indicators above, wherein each of the plurality of enclosures includes a phase change material that is different than remaining phase change materials of the plurality of phase change materials.

Aspects of the present disclosure include a visual indicator including a support substrate having thermal conduction pathways configured to provide thermal conduction between the visual indicator and an object, a plurality of enclosures, a plurality of phase change materials each disposed in a corresponding enclosure of the plurality of enclosures, wherein each of the plurality of enclosures includes a phase change material that is different than remaining phase change materials of the plurality of phase change materials, and a plurality of particles disposed in the plurality of enclosures, wherein corresponding particles disposed in a first location of an enclosure of the plurality of enclosures are configured to display a first visual signal and the corresponding particles disposed in a second location of the enclosure are configured to display a second visual signal.

Aspects of the present disclosure include the visual indicator above, wherein the plurality of particles are magnetic particles.

Aspects of the present disclosure include any of the visual indicators above, wherein each of plurality of enclosures includes a plurality of magnets configured to attract the corresponding particles into the first location of the corresponding enclosure.

Aspects of the present disclosure include any of the visual indicators above, wherein the first visual signal from the enclosure indicates a corresponding phase change material in the enclosure is in a solid state and the second visual signal from the enclosure indicates the corresponding phase change material in the enclosure is in a fluid state.

Aspects of the present disclosure include any of the visual indicators above, wherein the corresponding particles disposed in the first location of the enclosure comprises the corresponding particles disposed in an array pattern.

Aspects of the present disclosure include any of the visual indicators above, further comprises adhesive pads configured to removably attach the visual indicator to an object.

Aspects of the present disclosure include an optical indicator including a plurality of optical indicators, each including: a support substrate having thermal conduction pathways configured to provide thermal conduction between the optical indicator and an object, a plurality of enclosures, a plurality of phase change materials each disposed in a corresponding enclosure of the plurality of enclosures, wherein each of the plurality of enclosures includes a phase change material that is different than remaining phase change materials of the plurality of phase change materials, and a plurality of particles disposed in the plurality of enclosures, wherein corresponding particles disposed in a first location of an enclosure of the plurality of enclosures are configured to display a first visual signal and the corresponding particles disposed in a second location of the enclosure are configured to display a second visual signal, and an optical detector configured to detect the first visual signal and the second visual signal.

Aspects of the present disclosure include a temperature detector including a container having a first end, a second end, and an area, wherein a first pressure of the first end is higher than a second pressure of the second end, a pair of electrodes configured to apply a voltage across the area, at least one phase change material disposed in the first end and providing a barrier between the first end and the area, and a plurality of particles disposed in the at least one phase change material, wherein, in response to a temperature of the container rises above a phase transition temperature of the at least one phase change material the at least one phase change material transitions from a solid state to a fluid state, at least a portion of the plurality of particles is configured to diffuse into the area, and the application of the voltage is configured to cause a spark conduction in the area.

Aspects of the present disclosure include the temperature detector above, wherein the at least one phase change material includes a plurality of phase change materials.

Aspects of the present disclosure include any of the temperature detectors above, further comprises a first phase change material disposed in the first end and a second phase change material disposed in the area.

Aspects of the present disclosure include any of the temperature detectors above, further comprises a capacitor between the pair electrodes.

Aspects of the present disclosure include any of the temperature detectors above, wherein the pair of electrodes includes a high voltage electrode and a ground voltage electrode.

Aspects of the present disclosure include any of the temperature detectors above, further comprises an additional ground voltage electrode different than the ground voltage electrode.

Aspects of the present disclosure include any of the temperature detectors above, further comprises two capacitors between the high voltage electrode and the additional ground voltage.

Aspects of the present disclosure include any of the temperature detectors above, further comprises adhesive pads configured to removably attach the temperature detector to an object.

Aspects of the present disclosure include a temperature detection system including a plurality of temperature detectors each including a container having a first end, a second end, and an area, wherein a first pressure of the first end is higher than a second pressure of the second end, a pair of electrodes configured to apply a voltage across the area, at least one phase change material disposed in the first end and providing a barrier between the first end and the area, and a plurality of particles disposed in the at least one phase change material, wherein, in response to a temperature of the container rises above a phase transition temperature of the at least one phase change material the at least one phase change material transitions from a solid state to a fluid state, at least a portion of the plurality of particles is configured to diffuse into the area, and the application of the voltage is configured to cause a spark conduction in the area, and a controller configured to apply the voltage, determine, based on the applied voltage, a temperature or a temperature range reached by the temperature detection system.

Aspects of the present disclosure include the temperature detection system above, wherein the at least one phase change material includes a plurality of phase change materials.

Aspects of the present disclosure include any of the temperature detection systems above, wherein each of the plurality of temperature detectors further comprises a first phase change material disposed in the first end and a second phase change material disposed in the area.

Aspects of the present disclosure include any of the temperature detection systems above, wherein each of the plurality of temperature detectors further comprises a capacitor between the pair electrodes.

Aspects of the present disclosure include any of the temperature detection systems above, wherein each of the pair of electrodes includes a high voltage electrode and a ground voltage electrode.

Aspects of the present disclosure include any of the temperature detection systems above, wherein each of the plurality of temperature detectors further comprises an additional ground voltage electrode different than the ground voltage electrode.

Aspects of the present disclosure include any of the temperature detection systems above, wherein each of the plurality of temperature detectors further comprises two capacitors between the high voltage electrode and the additional ground voltage.

Aspects of the present disclosure include any of the temperature detection systems above, wherein each of the plurality of temperature detectors further comprises adhesive pads configured to removably attach the temperature detector to an object.

Aspects of the present disclosure include a sensor including a plurality of enclosures, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, and a plurality of particles disposed in the plurality of enclosures, a coil configured to generate an electromagnetic field configured to excite the plurality of particles, wherein exciting corresponding particles of an enclosure when the corresponding particles are disposed in a first location causes a first excitation response, and exciting the corresponding particles of the enclosure when the corresponding particles are disposed in a second location causes a second excitation response.

Aspects of the present disclosure include the sensor above, wherein the plurality of particles are magnetic particles.

Aspects of the present disclosure include any of the sensors above, wherein each of the plurality of enclosures includes a phase change material that is different than remaining phase change materials of the plurality of phase change materials.

Aspects of the present disclosure include any of the sensors above, further comprises adhesive pads configured to removably attach the sensor to an object.

Aspects of the present disclosure include any of the sensors above, wherein the plurality of enclosures are disposed around the coil.

Aspects of the present disclosure include any of the sensors above, wherein the coil is arranged as a square and the plurality of enclosures includes one enclosure on each of four sides of the square.

Aspects of the present disclosure include any of the sensors above, wherein the coil is arranged as an octagon and the plurality of enclosures includes one enclosure on each of eight sides of the octagon.

Aspects of the present disclosure include any of the sensors above, further comprises adhesive pads configured to removably attach the sensor to an object.

Aspects of the present disclosure include any of the sensors above, further comprises two or more terminals electrically coupled with the coil.

Aspects of the present disclosure include a temperature detection system including a plurality of sensors, each including a plurality of enclosures, a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials, and a plurality of particles disposed in the plurality of enclosures, a coil configured to generate an electromagnetic (EM) field configured to excite the plurality of particles, wherein exciting corresponding particles of an enclosure when the corresponding particles are disposed in a first location causes a first excitation response, and exciting the corresponding particles of the enclosure when the corresponding particles are disposed in a second location causes a second excitation response, and a controller configured to apply an excitation voltage or an excitation current for generating the EM field, determine, based on a characteristics of the excitation voltage or the excitation current, a temperature or a temperature range reached by the temperature detection system.

Aspects of the present disclosure include the temperature detection system above, wherein the plurality of particles are magnetic particles.

Aspects of the present disclosure include any of the temperature detection systems above, wherein, for each of the plurality of sensors, each of the plurality of enclosures includes a phase change material that is different than remaining phase change materials of the plurality of phase change materials.

Aspects of the present disclosure include any of the temperature detection systems above, wherein each of the plurality of sensors further comprises adhesive pads configured to removably attach the sensor to an object.

Aspects of the present disclosure include any of the temperature detection systems above, wherein, for each of the plurality of sensors, the plurality of enclosures are disposed around the coil.

Aspects of the present disclosure include any of the temperature detection systems above, wherein, for each of the plurality of sensors, the coil is arranged as a square and the plurality of enclosures includes one enclosure on each of four sides of the square.

Aspects of the present disclosure include any of the temperature detection systems above, wherein, for each of the plurality of sensors, the coil is arranged as an octagon and the plurality of enclosures includes one enclosure on each of eight sides of the octagon.

Aspects of the present disclosure include any of the temperature detection systems above, wherein each of the plurality of sensors further comprises adhesive pads configured to removably attach the sensor to an object.

Aspects of the present disclosure include any of the temperature detection systems above, wherein each of the plurality of sensors further comprises two or more terminals electrically coupled with the coil.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A sensor, comprising:

a plurality of enclosures;

a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials; and a plurality of particles disposed in the plurality of enclosures;

a coil configured to generate an electromagnetic field configured to excite the plurality of particles, wherein:

exciting corresponding particles of an enclosure when the corresponding particles are disposed in a first location causes a first excitation response detectable by a controller, and exciting the corresponding particles of the enclosure when the corresponding particles are disposed in a second location causes a second excitation response detectable by the controller indicating a corresponding phase change material of the enclosure has reached a corresponding phase transition temperature such that the corresponding particles moved from the first location to the second location, wherein the sensor is configured to reset by reversibly toggling the plurality of particles between the first location and the second location.

2. The sensor of claim 1, wherein the plurality of particles are magnetic particles.

3. The sensor of claim 1, wherein each of the plurality of enclosures includes a phase change material that is different than remaining phase change materials of the plurality of phase change materials.

4. The sensor of claim 1, further comprises adhesive pads configured to removably attach the sensor to an object.

5. The sensor of claim 1, wherein the plurality of enclosures are disposed around the coil.

6. The sensor of claim 1, wherein the coil is arranged as a square and the plurality of enclosures includes one enclosure on each of four sides of the square.

7. The sensor of claim 1, wherein the coil is arranged as an octagon and the plurality of enclosures includes one enclosure on each of eight sides of the octagon.

8. The sensor of claim 1, further comprises two or more terminals electrically coupled with the coil.

9. The sensor of claim 1, further comprises the controller configured to detect a resonant frequency of the electromagnetic field to determine a temperature or a temperature range reached by the sensor.

10. A temperature detection system, comprising:

a plurality of sensors, each including:

a plurality of enclosures;

a plurality of phase change materials each disposed in a corresponding enclosure of the plurality of enclosures, wherein at least a first phase transition temperature of a first phase change material of the plurality of phase change materials is different than a second phase transition temperature of a second phase change material of the plurality of phase change materials; and a plurality of particles disposed in the plurality of enclosures;

a coil configured to generate an electromagnetic (EM) field configured to excite the plurality of particles, wherein:

exciting corresponding particles of an enclosure when the corresponding particles are disposed in a first location causes a first excitation response detectable by a controller, and exciting the corresponding particles of the enclosure when the corresponding particles are disposed in a second location causes a second excitation response detectable by the controller indicating a corresponding phase change material of the enclosure has reached a corresponding phase transition temperature such that the corresponding particles moved from the first location to the second location; and the controller configured to:

apply an excitation voltage or an excitation current for generating the EM field, determine, based on a characteristics of the excitation voltage or the excitation current, a temperature or a temperature range reached by the temperature detection system wherein the sensor is configured to reset by reversibly toggling the plurality of particles between the first location and the second location.

11. The temperature detection system of claim 10, wherein the plurality of particles are magnetic particles.

12. The temperature detection system of claim 10, wherein, for each of the plurality of sensors, each of the plurality of enclosures includes a phase change material that is different than remaining phase change materials of the plurality of phase change materials.

13. The temperature detection system of claim 10, wherein each of the plurality of sensors further comprises adhesive pads configured to removably attach the sensor to an object.

14. The temperature detection system of claim 10, wherein, for each of the plurality of sensors, the plurality of enclosures are disposed around the coil.

15. The temperature detection system of claim 10, wherein, for each of the plurality of sensors, the coil is arranged as a square and the plurality of enclosures includes one enclosure on each of four sides of the square.

16. The temperature detection system of claim 10, wherein, for each of the plurality of sensors, the coil is arranged as an octagon and the plurality of enclosures includes one enclosure on each of eight sides of the octagon.

17. The temperature detection system of claim 10, wherein each of the plurality of sensors further comprises two or more terminals electrically coupled with the coil.

* * * * *